US009118908B2

United States Patent
Sumi et al.

(10) Patent No.: US 9,118,908 B2
(45) Date of Patent: Aug. 25, 2015

(54) TWO DIMENSIONAL/THREE DIMENSIONAL SWITCHABLE MODULE AND A METHOD OF DRIVING THE SAME

(71) Applicant: INNOLUX CORPORATION, Chu-Nan, Miao-Li County (TW)

(72) Inventors: Naoki Sumi, Chu-Nan (TW); Kazuyuki Hashimoto, Chu-Nan (TW); Toshihiko Araki, Chu-Nan (TW)

(73) Assignee: INNOLUX CORPORATION, Chu-Nan (TW)

( * ) Notice: Subject to any disclaimer, the term of this patent is extended or adjusted under 35 U.S.C. 154(b) by 217 days.

(21) Appl. No.: 13/750,721

(22) Filed: Jan. 25, 2013

(65) Prior Publication Data

US 2014/0210875 A1 Jul. 31, 2014

(51) Int. Cl.
*G09G 5/02* (2006.01)
*H04N 13/04* (2006.01)
*G09G 3/00* (2006.01)

(52) U.S. Cl.
CPC ............. *H04N 13/0409* (2013.01); *G09G 3/00* (2013.01); *H04N 13/0404* (2013.01); *H04N 13/0454* (2013.01)

(58) Field of Classification Search
CPC .. G09G 3/00; H04N 13/0404; H04N 13/0409

USPC ............ 345/172, 522, 419, 694, 697; 348/42, 348/51, 54–60
See application file for complete search history.

(56) References Cited

U.S. PATENT DOCUMENTS

| | | | |
|---|---|---|---|
| 7,227,522 B2 | 6/2007 | Fujimoto et al. | |
| 2004/0183792 A1 | 9/2004 | Takada et al. | |
| 2011/0050585 A1* | 3/2011 | Hotelling et al. | 345/173 |
| 2011/0234605 A1* | 9/2011 | Smith et al. | 345/522 |
| 2012/0007858 A1* | 1/2012 | Baek | 345/419 |

* cited by examiner

*Primary Examiner* — Nitin Patel
*Assistant Examiner* — Kuo Woo
(74) *Attorney, Agent, or Firm* — Liu & Liu

(57) ABSTRACT

A two dimensional/three dimensional (2D/3D) switchable display module comprising a display panel, an optical module, a gate driver and a data driver is disclosed. The display panel comprises a plurality of sub pixels electrically coupled to a plurality of gate lines and a plurality of data lines. The optical module is disposed on the display panel for changing light path from the display panel. The gate driver provides a plurality of scan signals to the gate lines. The data driver provides a plurality of data signals to the data lines. The gate driver provides the same scan signal to more than one gate lines at a same time or the data driver provides the same data signal to more than one data lines at a same time for displaying images.

18 Claims, 17 Drawing Sheets

TWO DIMENSIONAL/THREE DIMENSIONAL SWITCHABLE MODULE AND A METHOD OF DRIVING THE SAME

BACKGROUND OF THE INVENTION

1. Field of the Invention

The invention relates in general to a display module and a method for driving the same, and more particularly to a two dimensional/three dimensional (2D/3D) switchable display module and a method for driving the same.

2. Description of the Related Art

For the past few years, technologies and peripheral products for three dimensional displays are developed rapidly. Three dimensional (3D) stereoscopic display provides different images to binocular vision by utilizing a parallax between human eyes. The different images are received by individual eyes, merged by the brain and be developed into a stereoscopic image.

Most of the three dimensional displays should work with a three dimensional glasses. The three dimensional glasses are costly and inconvenient to users. Naked eye three dimensional (auto-stereoscopic) technology is then produced to solve the problem. The main types of naked eye 3D display are lenticular lens type and parallax barrier type.

The lenticular lens type display use lens to refract and separate light propagation path. The separated light which carries two individual images with parallax emits to the left eye and the right eye separately and induces human brain to generate stereoscopic visual effect. The parallax barrier type display uses a barrier as a light shielding. The shielding area and a light transmissible area are interlaced each other, such that the images observed by the user comprises a separated left eye image and a separated right eye image and can be merged by human brain.

FIG. 1 illustrates a schematic diagram of a conventional two view three dimensional lenticular lens type display 100. A display panel 11 comprising a plurality of sub pixels. A lens 15 is disposed in front of a display panel 11 and corresponding to two sub pixels. The light emitting from a backlight module 13 passes through the display panel 11 and be separated to two different paths by the lens 15. When the display panel 11 displays different images with parallax in odd sub pixels and even sub pixels and light of odd pixels and even pixels are finely separated to the left eye and the right eye, the left eye and the right eye see different images. Therefore, a three dimensional image can be construct by human brain. When odd sub pixels and even sub pixels display same images, a flatting two dimensional result without stereoscopic parallax performance is shown.

Recently, the naked eye 3D display requires 2D-3D switchable function for mobile device such as smart phone or tablet to keep the original 2D performance for word processing. For a 2D-3D switchable display, a fixed type lenticular lens or a parallax barrier can produce both three dimensional and two dimensional effect by doubling the sub pixels (double resolution) and image input in three dimensional mode. Double resolution brings double gate driver inputting pins (double gate driver IC), half scan frame time, double data signal modulating (double size image), double signal processing loading of timing controller (T-con) driver, high cost for total system.

Another type of the 2D-3D switchable display can be implemented by replacing switchable lenticular lens or switchable parallax barrier with invalid performance (near no refraction/barrier effect) in 2D mode. There is no double resolution, double gate/data signal input, or double size image input requirement compared with the fixed type 2D/3D switchable display. However, the manufacturing procedure of the display is hard and the thickness of the display increases in these types of 2D-3D switchable display.

SUMMARY OF THE INVENTION

The invention is directed to a two dimensional/three dimensional (2D/3D) switchable display module and a method for driving the same. The gate driver or the data driver of the 2D/3D switchable display module provides same signal to more than one gate lines or to more than one data lines at the same time for displaying images.

According to a first aspect of the present invention, a two dimensional/three dimensional (2D/3D) switchable display module comprising a display panel, an optical module, a gate driver and a data driver is disclosed. The display panel comprises a plurality of sub pixels electrically coupled to a plurality of gate lines and a plurality of data lines. The optical module is disposed on the display panel for changing light path from the display panel. The gate driver provides a plurality of scan signals to the gate lines. The data driver provides a plurality of data signals to the data lines. The gate driver provides the same scan signal to more than one gate lines at a same time or the data driver provides the same data signal to more than one data lines at a same time for displaying images.

According to a second aspect of the present invention, a method of driving a two dimensional/three dimensional (2D/3D) switchable display module is disclosed. The method comprises following steps. A display panel comprising a plurality of sub pixels, an optical module, a gate driver and a data driver is provided. The sub pixels is electrically coupled to a plurality of gate lines and a plurality of data lines, the optical module is disposed on the display panel for changing light path from the display panel. The gate driver provides a same scan signal to more than one gate lines at a same time, or the data driver provides a same data signal to more than one data lines at a same time for displaying images.

The above and other aspects of the invention will become better understood with regard to the following detailed description of the preferred but non-limiting embodiment(s). The following description is made with reference to the accompanying drawings.

DETAILED DESCRIPTION OF THE INVENTION

First Embodiment

Figure 1:
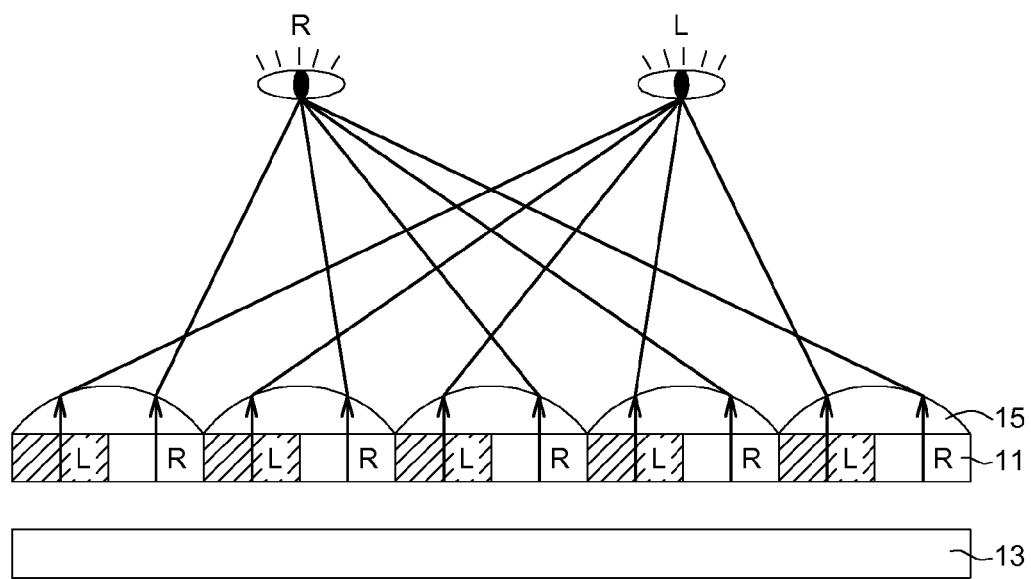
FIG. 1 (Prior Art) is a schematic diagram of a conventional two view type three dimensional lenticular lens type display.
Figure 2:
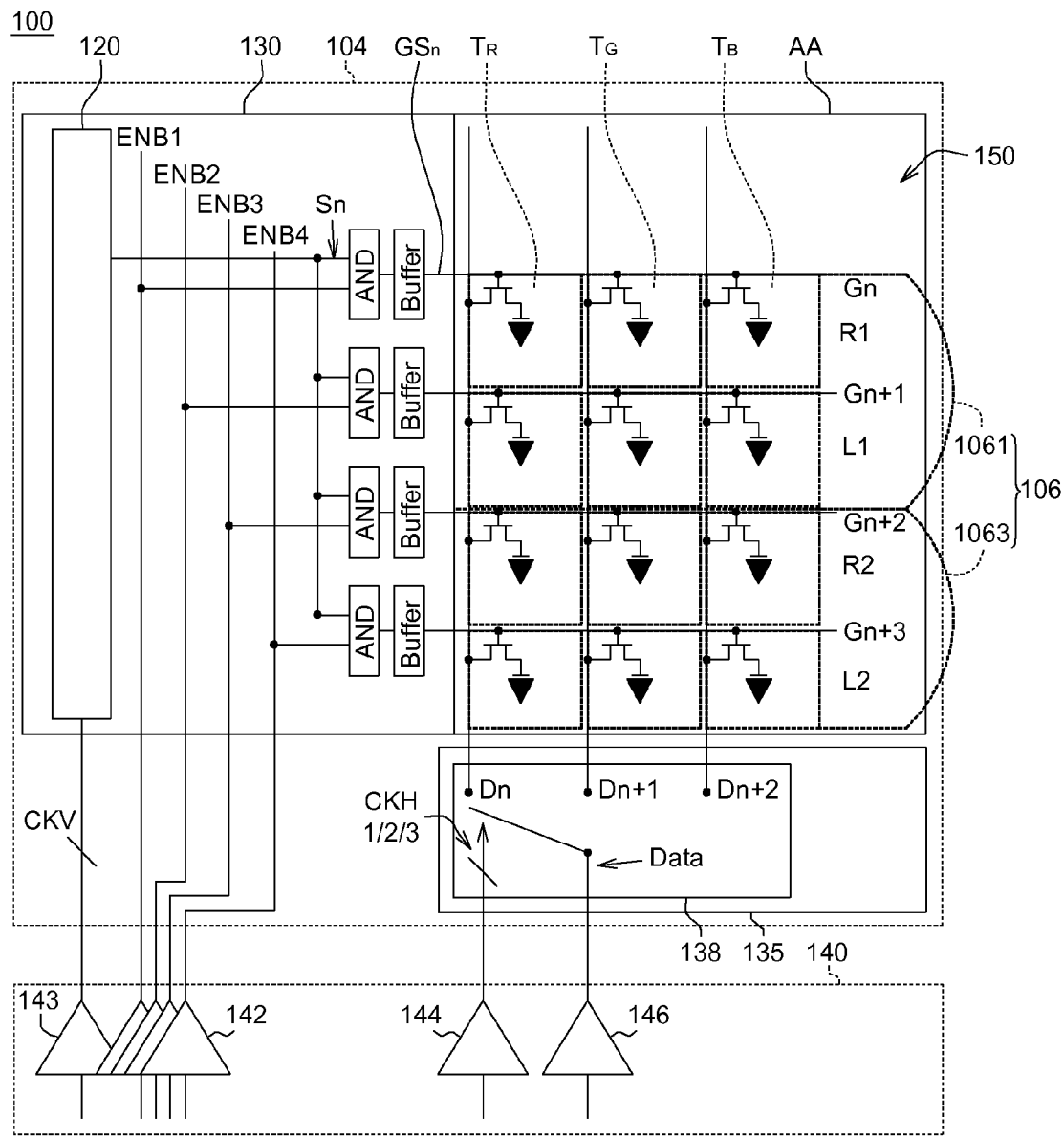
FIG. 2 illustrates a two view type two dimensional/three dimensional (2D/3D) switchable display module.

FIG. 2 illustrates a two view type two dimensional/three dimensional (2D/3D) switchable display module 100. The term "two view type" means that the display uses two parallax image combination for showing stereoscopic performance. Referring to FIG. 2, the 2D/3D switchable display module 100 comprises a display panel 104, a gate driver 130, a data driver 135, an optical module 106 and a display driver IC 140. The display panel 104 has a pixel matrix 150 comprising a plurality of sub pixels, a plurality of gate lines, and a plurality of data lines. The sub pixels of the pixel matrix 150 arranged in matrix type, and each one is electrically coupled to at least one gate line and at least one data line by at least one thin film transistor (TFT). The gate lines such as a first gate line Gn, a second gate line Gn+1, a third gate line Gn+2 and, a fourth gate line Gn+3 are arranged sequentially. The data lines such as a first data line Dn, a second data line Dn+1, and third data line Dn+2 are arranged sequentially. The parameter n is a positive integral (such as 1, 2, 3 . . . , etc.), and a limit of n corresponds to the resolution of the display panel 104. A portion of the pixel matrix 150 is called an active area AA for showing images. The sub pixels not belong to the active area AA are called dummy sub pixels which are often covered by black matrix (BM) and not for displaying.

The optical module 106 is disposed on the display panel 104 and must fully cover the active area AA for changing a light path of a light emitting from the active area AA. The interlayer of the optical module 106 and the display panel 104 is air, glue or other optical modulating material. The optical module 106 can be a fixed lenticular lens, a fixed parallax barrier, a switchable lens, or a switchable barrier, and the invention is not limited thereto. The optical module 106 comprises a plurality of optical elements, such as a first optical element 1061 and a second optical element 1063, and each optical element corresponds to two adjacent rows of the sub pixels. The first optical element 1061 and the second optical element 1063 are arranged in row and along a direction of the gate lines. The first optical element 1061 is lens shaped and covers the sub pixels corresponding to the first gate line Gn and the second gate line Gn+1. The second optical element 1063 is lens shaped and covers the sub pixels corresponding to the third gate line Gn+2 and the fourth gate line Gn+3. The curvature of the first optical element 1061 and second optical element 1063 can be the same or different depends on an optical design. The gate driver 130 comprises a shift register 120, four AND logic gates (AND), four buffers (Buffer), and four enable lines ENB1, ENB2, ENB3 and ENB4. The gate driver 130 can comprise a plurality of groups, and each group includes one shift register, 4 AND logic gates and 4 buffers. The input terminals of each AND logic gate are electrically coupled with the shift register 120 and a corresponding enable line ENB1, ENB2, ENB3 or ENB4. The output terminal of each AND logic gates are electrically coupled with one input terminal of a corresponding buffer. The output terminal of each buffer connects with one corresponding gate line Gn, Gn+1, Gn+2 or Gn+3 for providing scan signals GSn to the gate lines Gn~Gn+3. The data driver 135 comprises a de-multiplexer 138. The de-multiplexer 138 is used for providing a plurality of data signals to the data lines Dn~Dn+2 sequentially or randomly.

In one embodiment, the 2D/3D switchable display module 100 can be implanted by a system on glass (SOG) circuit. In other words, the gate driver 130 and the data driver 135 can be disposed on the display panel 104 and manufactured by the same process as that of the TFTs and electrodes of the display panel 104. Some part of the gate driver or data driver which was traditionally on a chip can be formed on glass in the embodiment so that the manufacturing cost can be reduced. The TFT active layer of gate driver 130 and the data driver 135 could be low temperature poly-Si (LTPS), α-Si, or transparent amorphous oxide semiconductor (IGZO), but the invention is not limited thereto.

The display driver IC 140 can be configured to provide timing controlling signals to control the gate driver 130 and the data driver 135. The display driver IC 140 can comprise a scan time controller 142, a shift register controller 143, a de-multiplexer time controller 144 and a data output circuit 146. The shift register controller 143 provides a clock signal CKV to the input terminal of the shift register 120, and outputs an initial signal Sn to the AND logic gates. The scan time controller 142 provides a first enable signal ENB1, a second enable signal ENB2, a third enable signal ENB3 and a fourth enable signal ENB4 to the input terminal of the four AND logic gates through the four enable lines. The AND logic gates are controlled by the enable signals ENB1~ENB4 to selectively output the scan signal GSn to the corresponding buffers. The buffers then output the scan signal GSn to the gate lines Gn~Gn+3 and enable TFTs of the selected gate line. The de-multiplexer time controller 144 provides a clock signal CKH1/2/3 to the de-multiplexer 138 for controlling which data line could receive data signals from the data output circuit 146. The data sending order of the de-multiplexer 138 could be sequential or random.

The sub pixels in a same column are covered by same color filter and display the same color. Red sub pixels $T_R$, green sub pixels $T_G$ and blue sub pixels $T_B$ are sequentially disposed and respectively arranged in each column. The sub pixels with the same color are arranged in a direction orthogonal to a long axis of the optical element 1061 or a long axis of the optical element 1063. A red sub pixel $T_R$, a green sub pixel $T_G$ and a blue sub pixel $T_B$ make a pixel (display dot). The pixel matrix 150 comprises a first pixel group R1 (for right eye image), a second pixel group L1 (for left eye image), a third pixel group R2 (for right eye image) and a fourth pixel group L2 (for left eye image) sequentially disposed in row along a direction of each of the gate lines Gn~Gn+3. The first pixel group R1 and the second pixel group L1 are covered by the first optical element 1061. The third pixel group R2 and the fourth pixel group L2 are covered by the second optical element 1063.

Figure 3A:
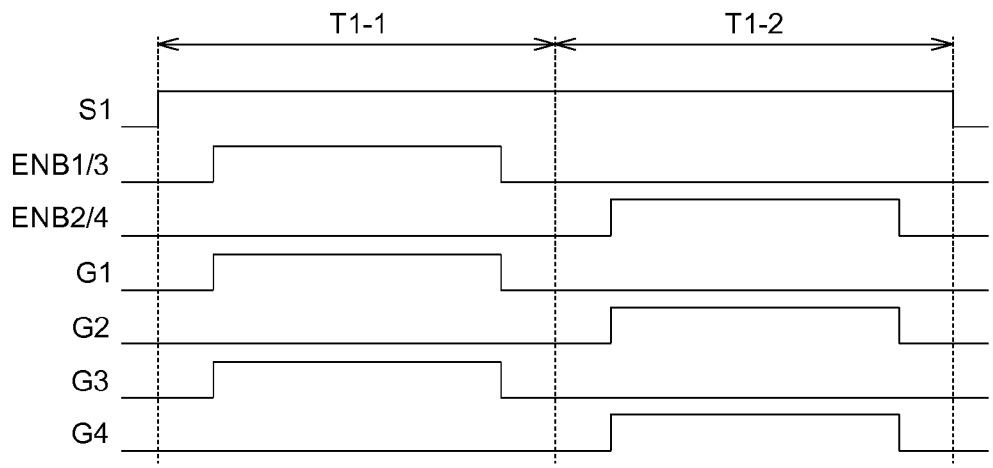
FIG. 3A illustrates waveform diagrams for driving the 2D/3D switchable display module 100 in a three dimensional mode.
Figure 3B:
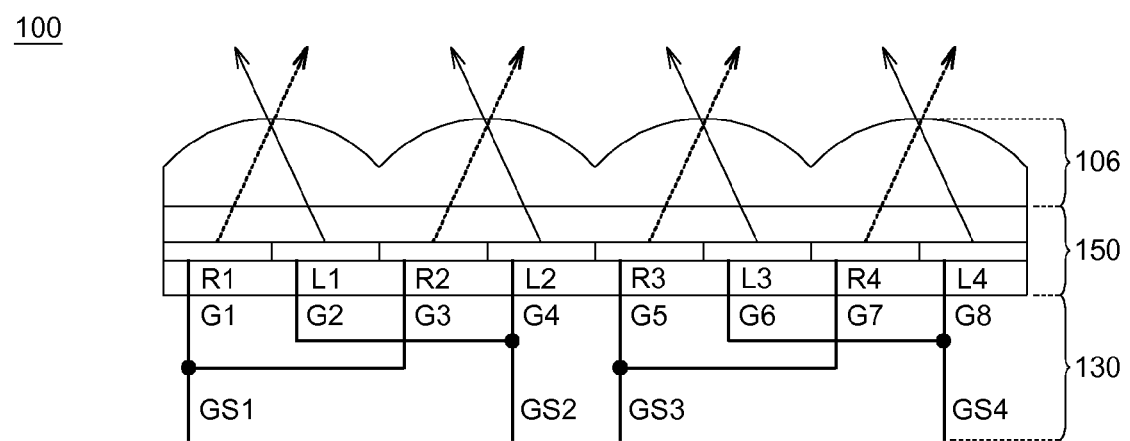
FIG. 3B illustrates a simplified cross section view of the 2D/3D switchable display module in a three dimensional mode.

FIG. 3A illustrates waveform diagrams for driving the 2D/3D switchable display module 100 in a three dimensional mode. FIG. 3B illustrate a simplified cross section view (cuts through column direction, like a direction along the Red sub pixels $T_R$) of the 2D/3D switchable display module 100 in a three dimensional mode. Referring to FIG. 3A, where n=1, the display driver IC 140 (shown in FIG. 2) provides a first enable signal ENB1 and a third enable signal ENB3 (ENB1/3) within a scan period T1-1 to enable the first pixel group R1 and the third pixel group R2. The TFTs of the sub pixels electrically coupled to the first gate line G1 and the third gate line G3 are simultaneously driven by a scan signal GS1. Besides, the display driver IC 140 (shown in FIG. 2) provides a second enable signal ENB2 and a forth enable signal ENB4 (ENB2/4) within a next scan period T1-2 to enable the second pixel group L1 and the fourth pixel group L2. The TFTs of the sub pixels electrically coupled to the second gate line G2 and the fourth gate line G4 are simultaneously driven by a scan signal GS2. The second and fourth enable signals ENB2 and ENB4 are delayed relative to the first and third enable signals ENB1 and ENB3. The driving method in other scan periods, such as scan period T1-3 and scan period T1-4, follows the rule described above and is omitted in this figure.

Referring to FIGS. 2 and 3A~3B, gate driver 130 outputs signals to the pixel matrix 150. When TFTs of the sub pixels electrically coupled to the first gate line G1 and the third gate line G3 are enabled, the first pixel group R1 and the third pixel group R2 receive the same scan signal GS1 simultaneously, the second pixel group L1 and the fourth pixel group L2 receive the same scan signal GS2 simultaneously. In other words, the gate driver 130 provides same scan signal to more than one non-adjacent (non-serial) gate lines at the same time. If the pixel groups receive the same scan signal, they are enabled at the same period and get the same data signals. While inputting right eye image to the sub pixels of the first pixel group R1 and the third pixel group R2, the light passes from these sub pixels will bring the right eye information and be directed to right eye of the observer by the left side curvature of the optical module 106. While inputting left image to the sub pixels of the second pixel group L1 and the fourth pixel group L2, the light passes from these sub pixels will bring the left eye information and be directed to left eye of the observer by the right side curvature of the optical module 106. Therefore, the observer of the 2D/3D switchable display module 100 can recognize stereoscopic images on display screen. Besides, the fifth pixel group R3 and the seventh pixel group R4 receive the same signal GS3 simultaneously in the scan period T1-3 (not shown), and the sixth pixel group L3 and the eighth pixel group L4 receive the same signal GS4 simultaneously in the scan period T1-4 (not shown).

In 3D mode, the gate driver 130 provides a first enable signal to enable TFTs on two adjacent odd gate lines of the gate lines simultaneously in a period, and the gate driver 130 provides a second enable signal to enable TFTs on two adjacent even gate lines of the gate lines simultaneously in a next period. In other words, in 3D mode, the gate driver 130 provides a first scan signal GS1 to two adjacent odd gate lines of the gate lines simultaneously in a period, and the gate driver 130 provides a second scan signal GS2 to two adjacent even gate lines of the gate lines simultaneously in a next period.

Figure 4A:
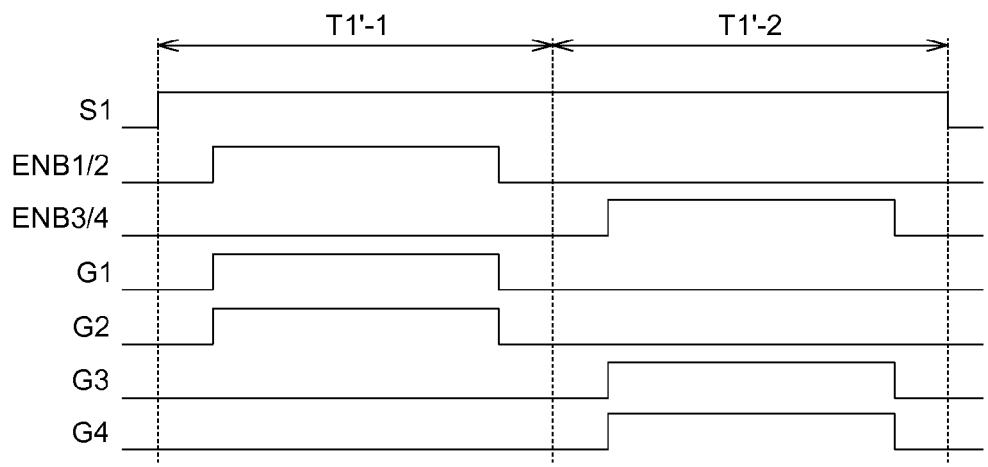
FIG. 4A illustrates waveform diagrams for driving the 2D/3D switchable display module in a two dimensional mode.
Figure 4B:
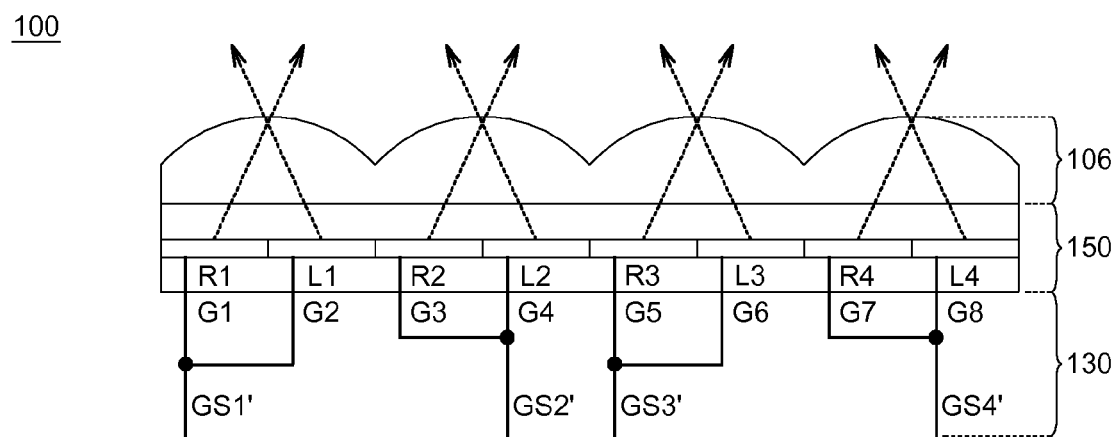
FIG. 4B illustrates a simplified cross section view of the 2D/3D switchable display module 100 in a two dimensional mode.

FIG. 4A illustrates waveform diagrams for driving the 2D/3D switchable display module 100 in a two dimensional mode. FIG. 4B illustrates a simplified cross section view of the 2D/3D switchable display module 100 in a two dimensional mode. Referring to FIG. 4A, where n=1, the display driver IC 140 (shown in FIG. 2) provides a first enable signal ENB1 and a second enable signal ENB2 (ENB/1/2) within a scan period T1'-1 to enable the first pixel group R1 and the second pixel group L1. The TFTs of the sub pixels electrically coupled to the first gate line G1 and the second gate line G2 are simultaneously driven by a scan signal GS1. Besides, the display driver IC 140 (shown in FIG. 2) provides a third enable signal ENB3 and a fourth enable signal ENB4 (ENB3/4 in FIG. 4A) within a next scan period T1'-2 to enable the first pixel group R1 and the second pixel group L1. The TFTs of the sub pixels electrically coupled to the third gate line G3 and the fourth gate line G4 are simultaneously driven by a scan signal GS2. The third and fourth enable signals ENB3 and ENB4 are delayed relative to the first and second enable signals ENB1 and ENB2. The driving method in other scan periods, such as scan period T1'-3 and scan period T1'-4, follows the rule described above and is omitted in this figure.

Referring to FIGS. 2 and 4B, when TFTs of the sub pixels electrically coupled to the first gate line G1 and the second gate line G2 are enabled, the first pixel group R1 and the second pixel group L1 receive the same signal GS1' simultaneously, the third pixel group R2 and the fourth pixel group L2 receive the same signal GS2' simultaneously. While inputting the same image or different image (double resolution) to the sub pixels of the first pixel group R1 and the second pixel group L1, the light passing these sub pixels are captured by both eyes of the observer through the optical module 106. While inputting the same image or different image (double resolution) to the sub pixels of the third pixel group R2 and the fourth pixel group L2, the light passing these sub pixels are captured by both eyes of the observer through the optical module 106. In other words, the gate driver 130 still provides same scan signal to more than one adjacent (serial) gate lines at the same time. Thus, the image provided by the 2D/3D switchable display module 100 will be mixed by the observer, and he can recognize a 2D image on display screen. Besides, the fifth pixel group R3 and the sixth pixel group L3 receive the same scan signal GS3' simultaneously in the scan period T1'-3 (not shown), and the seventh pixel group R4 and the eighth pixel group L4 receive the same scan signal GS4' simultaneously in the scan period T1'-4 (not shown).

In this embodiment, the 2D/3D switchable display module 100 utilizes double sub-pixel TFT array to drive the pixel matrix. Normal size image can be inputted (half resolution image) so that the resolution of the image remains (not to be doubled as sub pixels). In 3D mode, the gate driver 130 can drive at least two non-adjacent (non-serial) gate lines at the same time. In 2D mode, the gate driver 130 can drive at least two adjacent (serial) gate lines at the same time. The switching process between 3D mode and 2D mode just depends on different driving scheme of waveform diagrams in the same circuit circumstances. Such that the manufacturing cost can be reduced. The gate driver 130 controls the 2D/3D switchable display module 100 to switch between 3D mode or 2D mode by means of swapping the first/the third gate lines and the second/the fourth gate lines to the first/second and the third/the fourth gate lines for receiving the same scan signal simultaneously. In 2D mode, the gate driver 130 provides a first enable signal to two adjacent gate lines of the gate lines simultaneously in a period, and the gate driver 130 provides a second enable signal to next two adjacent gate lines of the gate lines simultaneously in a next period. In other words, in 2D mode, the gate driver 130 provides a first scan signal GS1' to two adjacent gate lines of the gate lines simultaneously in a period, and the gate driver 130 provides a second scan signal GS2' to next two adjacent gate lines of the gate lines simultaneously in a next period.

Second Embodiment

Figure 5:
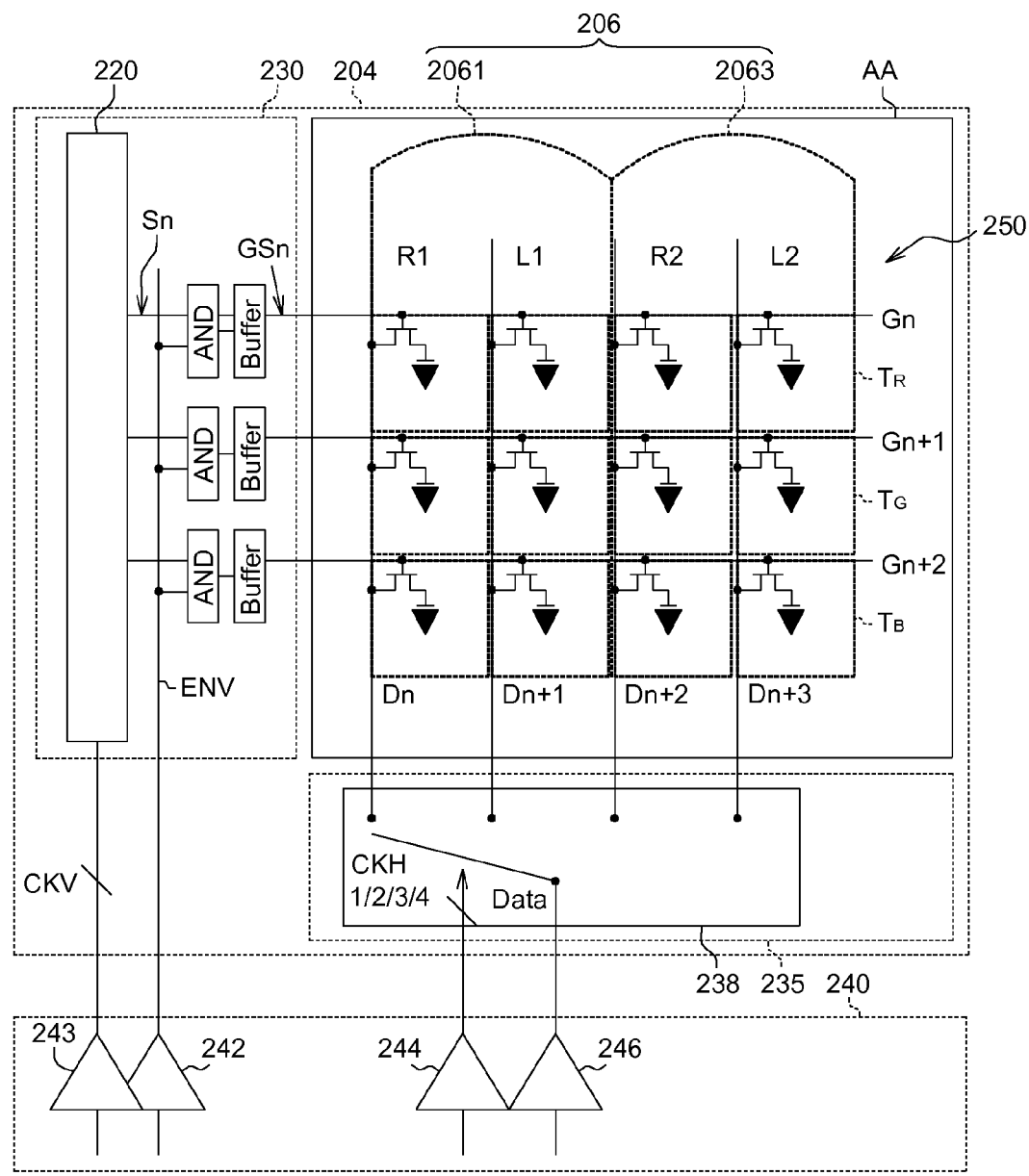
FIG. 5 illustrates a two view type two dimensional/three dimensional (2D/3D) switchable display module.

FIG. 5 illustrates a two view two dimensional/three dimensional (2D/3D) switchable display module 200. Referring to FIG. 5, the 2D/3D switchable display module 200 comprises a display panel 204, a gate driver 230, a data driver 235, an optical module 206 and a display driver IC 240. The display panel 204 has a pixel matrix 250 comprising a plurality of sub pixels, The sub pixels of the pixel matrix 250 arranged in matrix type and each one is electrically coupled to at least one gate line and at least one data line by at least one thin film transistor (TFT). The gate lines, such as a first gate line Gn, a second gate line Gn+1 and a third gate line Gn+2 are arranged sequentially. The data lines, such as a first Dn, a second data line Dn+1, a third data line Dn+2 and a fourth data line Dn+3 are arranged sequentially. Where n is a positive integral (such as 1, 2, 3 . . . , etc.) and a limit of n corresponds to the resolution definition of the display panel 104. A portion of the pixel matrix 250 is called an active area AA for showing images. The sub pixels not belong to the active area AA are called dummy sub pixels which often covered by black matrix (BM) and not for displaying.

The optical module 206 is disposed on the display panel 204 and fully covered the active area AA and can be the same as the optical module 106. The optical module 206 comprises a plurality of optical elements, such as a first optical element 2061 and a second optical element 2063, the first optical element 2061 and the second optical element 2063 are arranged in column and along a direction of the data lines. Each optical element corresponds to two adjacent columns of the sub pixels. The first optical element 2061 is lens shaped and covers the sub pixels corresponding to the first data line Dn and the second data line Dn+1. The second optical element 2063 is lens shaped and covers the sub pixels corresponding to the third data line Dn+2 and the fourth data line Dn+3. The curvature of the first optical element 2061 and second optical element 2063 can be the same or different depends on optical design. The gate driver 230 comprises a shift register 220, a plurality of AND logic gates, a plurality of buffers (Buffer) and an enable lines. The gate driver 230 can comprise a plurality of groups, and each group includes one shift register, one AND logic gate and one buffer. The input terminals of each AND logic gate electrically coupled with the shift register 220 and one corresponding enable line. The output terminal of each AND logic gate is electrically coupled with one buffer's input terminal. The output terminal of the buffer connects with one corresponding gate lines Gn~Gn+2 for providing a plurality of scan signals to the gate lines Gn~Gn+2. The data driver 235 comprising at least one de-multiplexer 238 is used for providing a plurality of data signals to the data lines Dn~Dn+3 sequentially or randomly. In one embodiment, the 2D/3D switchable display module 200 can be implemented by a system on glass (SOG) circuit. The manufacturing method and materials of the gate driver 230 and the data driver 235 can be the same as that of the gate driver 130 and the data driver 135, but the invention is not limited thereto.

The display driver IC 240 can be configured to provide timing controlling signals to control the gate driver 230 and the data driver 235. The display driver IC 240 can comprise a scan time controller 242, a shift register controller 243, a de-multiplexer time controller 244 and a data output circuit 246. The shift register controller 243 provides a clock signal CKV to the input terminal of the shift register 220, and the shift register 220 outputs an initial signal Sn to the AND logic gates. The scan time controller 242 also provides an enable signal ENV to the input terminal of all AND logic gates through the enable line. The AND logic gates are controlled by the enable signal ENV to selectively output the scan signal GSn to the corresponding buffers. The buffers then output the scan signal GSn to the gate lines Gn~Gn+2 and enable the TFTs of the selected gate line. The de-multiplexer time controller 244 provides a first clock signal CKH1, a second clock signal CKH2, a third clock signal CKH3 and a fourth clock signal CKH4 to the de-multiplexer 238, and the clock signals CKH1/2/3/4 control the selected data lines Dn~Dn+3 for receiving data. The data signals from the data output circuit 246 are outputted to corresponding TFTs coupling to the selected data lines. The data sending order of the de-multiplexer 238 could be sequential or random.

The sub pixel matrix 250 comprises a plurality of sub pixels. The sub pixels in a same row are covered by same color filter and display the same color. The red sub pixels $T_R$, the green sub pixels $T_G$ and the blue sub pixels $T_B$ are sequentially disposed and respectively arranged in each row. A red sub pixel $T_R$, a green sub pixel $T_G$ and a blue sub pixel $T_B$ make a pixel (display dot). The sub pixels with the same color are arranged in a direction orthogonal to a long axis of the optical element 2061 or a long axis of the optical element 2063. The pixel matrix 250 comprises a first pixel group R1 (for right eye image), a second pixel group L1 (for left eye image), a third pixel group R2 (for right eye image) and a fourth pixel group L2 (for left eye image) sequentially disposed along a direction of each of the data lines Dn~Dn+3. The first pixel group R1 and the second pixel group L1 are covered by the first optical element 2061. The third pixel group R2 and the fourth pixel group L2 are covered by the second optical element 2063.

Figure 6A:
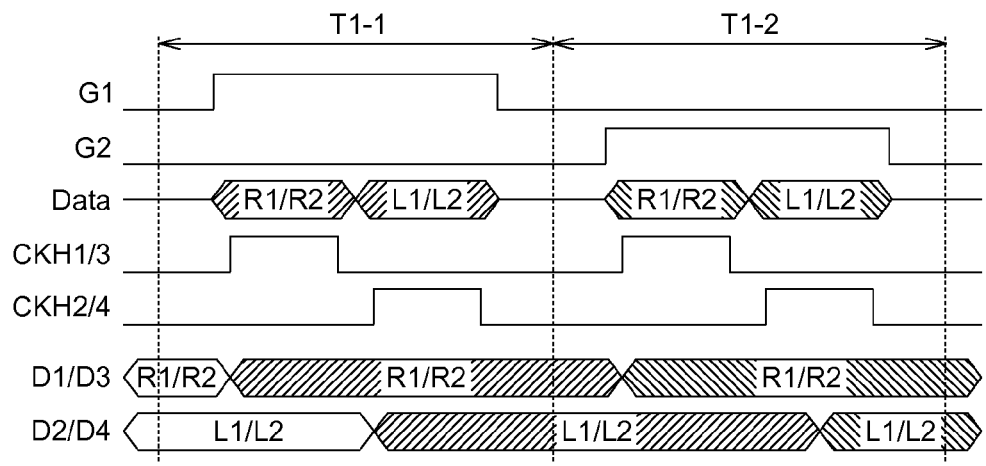
FIG. 6A illustrates waveform diagrams for driving the 2D/3D switchable display module in a three dimensional mode.
Figure 6B:
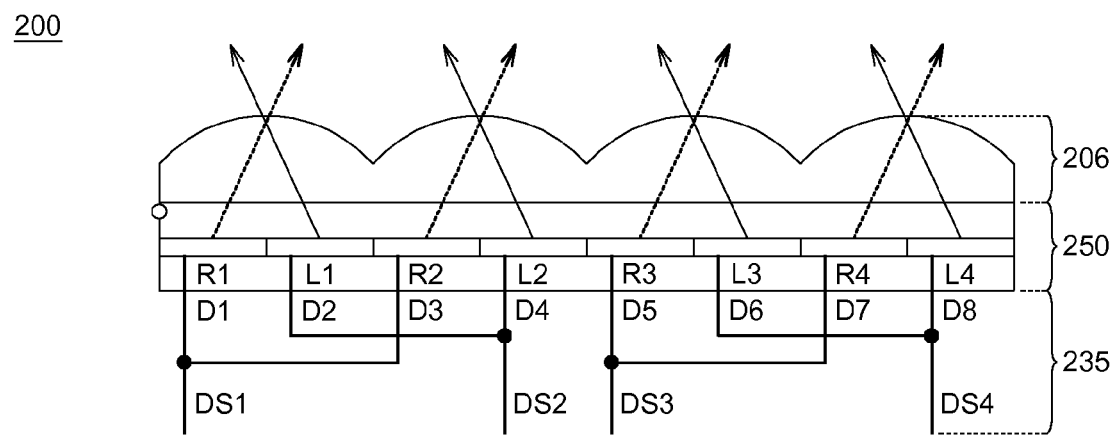
FIG. 6B illustrates a simplified cross section view of the 2D/3D switchable display module 200 in a three dimensional mode.

FIG. 6A illustrates waveform diagrams for driving the 2D/3D switchable display module 200 in a three dimensional mode. FIG. 6B illustrates a simplified cross section view (cuts through row direction, like a direction along $T_R$) of the 2D/3D switchable display module 200 in a three dimensional mode. Referring to FIGS. 5 and 6A, the clock signals CKH1/2/3/4 can be used to select the data signals from data output circuit 246 to the data lines Dn~Dn+3. The data signals filled with different section lines represent different color signals.

Where n=1, the gate driver 230 (shown in FIG. 5) provides a square wave scan signal GS1 to the first gate line G1 within a scan period T1-1. The data driver 235 (shown in FIG. 5) provides a first clock signal CKH1 and a third clock signal CKH3 (CKH1/3 in FIG. 6A) within a beginning part (front portion) of the scan period T1-1 and data signals within the scan period T1-1, so that the first data line D1 and the third data line D3 receive the same data signal DS1 simultaneously. Besides, the gate driver 230 (shown in FIG. 5) provides a square wave scan signal GS2 to the second gate line G2 within a scan period T1-2. The data driver 235 (shown in FIG. 5) provides a second clock signal CKH2 and a fourth signal CKH4 (CKH2/4 in FIG. 6A) within a latter part (back portion) of the scan period T1-2 and data signals within the scan period T1-2, so that the second data line D2 and the fourth data line D4 receive a same data signal DS2 simultaneously. The second and the forth clock signals CKH2 and CKH4 are delayed relative to the first and the third clock signals CKH1 and CKH3. The driving method in other scan periods, such as scan period T1-3 and scan period T1-4, follows the rule described above and is omitted in this figure.

Referring to FIGS. 5 and 6B, signals from data driver 235 are outputted to the pixel matrix 250. Where the first data line D1 and the third data line D3 receive the same signal, the first pixel group R1 and the third pixel group R2 receive the same data signal DS1 simultaneously, the second pixel group L1 and the fourth pixel group L2 receive the same data signal DS2 simultaneously. If inputting the data signal DS1 for right eye and the data signal DS2 for left eye, the observer can recognize stereoscopic images on display screen through optical module 206 of the 2D/3D switchable display module 200. In other words, the data driver 235 provides same data signal to more than one non-continuous (non-adjacent) data lines at the same time (a frame interval). Besides, the fifth pixel group R3 and the seventh pixel group R4 receive the same data signal DS3 simultaneously, and the sixth pixel group L3 and the eighth pixel group L4 receive the same data signal DS4 simultaneously.

Figure 7A:
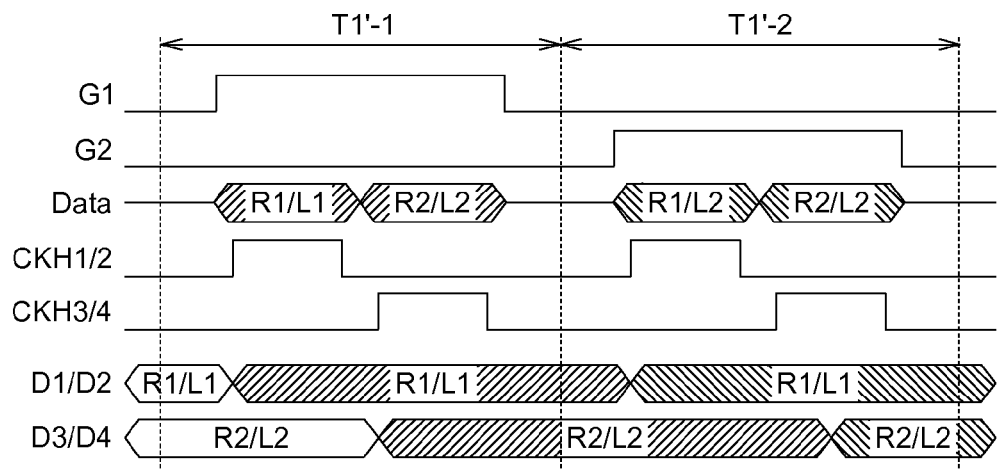
FIG. 7A illustrates waveform diagrams for driving the 2D/3D switchable display module in a two dimensional mode.
Figure 7B:
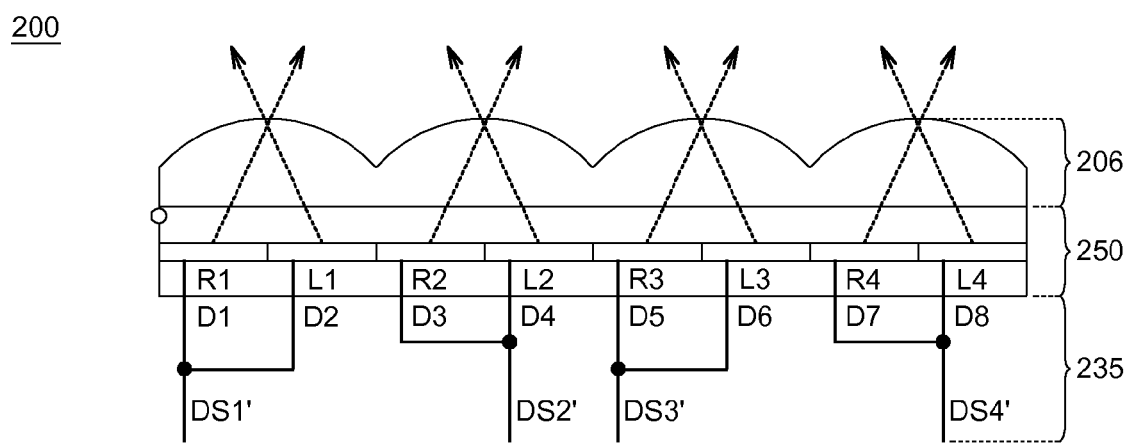
FIG. 7B illustrates a simplified cross section view of the 2D/3D switchable display module in a two dimensional mode.

In other words, the display driver IC 240 controls the data driver 235 to provide a first data signal DS1 to two adjacent odd data lines of the data lines simultaneously in a period, and the data driver 235 provides a second data signal DS2 to two adjacent even data lines of the data lines simultaneously in next period, FIG. 7A illustrates waveform diagrams for driving the 2D/3D switchable display module 200 in a two dimensional mode. FIG. 7B illustrates a simplified cross section view of the 2D/3D switchable display module 200 in a two dimensional mode. Referring to FIG. 7A, the clock signals CKH1/2/3/4 can be used to select the data signals from data output circuit 246 to the data lines Dn~Dn+3 (such as D1~D4). The data signals filled with different section lines represent different color signals.

Where n=1, the gate driver 230 provides a square wave scan signal GS1' to the first gate line G1 within a scan period T1'-1. The data driver 235 (shown in FIG. 5) provides a first clock signal CKH1 and a second clock signal CKH2 (CKH1/2 in FIG. 7A) within a beginning part of the scan period T1'-1 and data signals within the scan period T1'-1, so that the first data line D1 and the second gate line D2 receive a same data signal DS1' simultaneously. The gate driver 230 provides a square wave scan signal GS2' to the second gate line G2 within a scan period T1'-2. The data driver 235 provides a third clock signal CKH3 and fourth clock signal CKH4 (CKH 3/4 in FIG. 7A) within a latter part of the scan period T1'-2 and data signals within the scan period T1'-2, so that the third data line D3 and the fourth data line D4 receive a same data signal DS2' simultaneously. The third and the fourth clock signals CKH3 and CKH4 are delayed relative to the first and the second clock signals CKH1 and CKH2. The driving method during other scan periods, such as scan period T1'-3 and scan period T1'-4, follows the rule described above and is omitted in this figure.

Referring to FIGS. 5 and 7B, data signals 202 are outputted to the display panel 204. When the first data line D1 and the second data line D2 receive the same signal, the first pixel group R1 and the second pixel group L1 receive the same signal DS1' simultaneously, the third pixel group R2 and the fourth pixel group L2 receive the same signal DS2' simultaneously. In this time, only 2D image is shown for the observer from looking at the 2D/3D switchable display module 200. In other words, the data driver 235 provides same data signal to more than one adjacent (serial) data lines at the same time. Besides, the fifth pixel group R3 and the sixth pixel group L3 receive the same signal DS3' simultaneously, and the seventh pixel group R4 and the eighth pixel group L4 receive the same signal DS4' simultaneously.

In this embodiment, the 2D/3D switchable display module 200 utilize double sub-pixel TFT array to drive the pixel matrix 250. Normal size image can be inputted (half resolution image) so that the resolution of the image remains (not to be doubled as sub pixels). In 3D mode, the data driver 235 can drive at least two non-adjacent (non-serial) data lines at the same time. In 2D mode, the data driver 235 can drive at least two adjacent (serial) gate lines at the same time. The switching process between 3D mode and 2D mode just depends on different driving schemes of waveform diagrams in the same circuit circumstances. Such that the manufacturing cost can be reduced. The data driver controls the 2D/3D switchable display module 200 to switch between 3D mode or 2D mode by means of swapping the first/the third data lines and the second/the fourth data lines to the first/second and the third/the fourth data lines for receiving the same data signal simultaneously.

In other words, in 2D mode, the display driver IC 240 controls the data driver 235 to provide a first data signal DS1' to two adjacent data lines of the data lines simultaneously in a period, and the data driver 235 provides a second data signal DS2' to next two adjacent data line of the data lines simultaneously in next period.

Third Embodiment

Figure 8A:
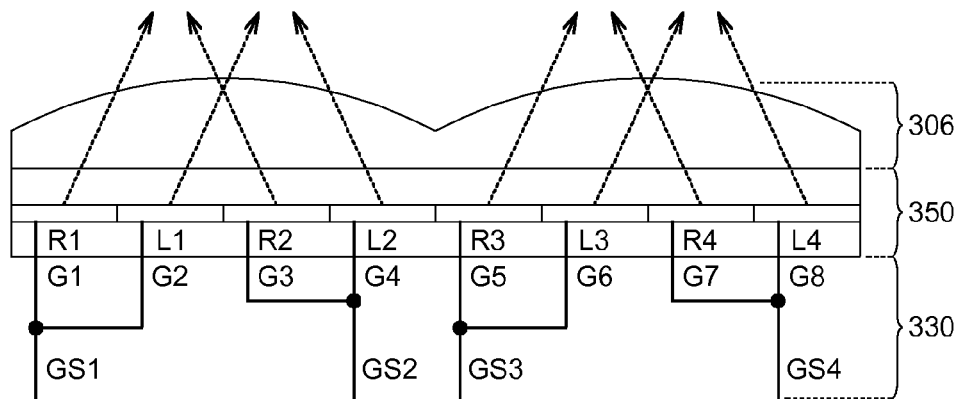
FIG. 8A illustrates a simplified cross section view of the two view type 2D/3D switchable display module in a three dimensional mode.
Figure 8B:
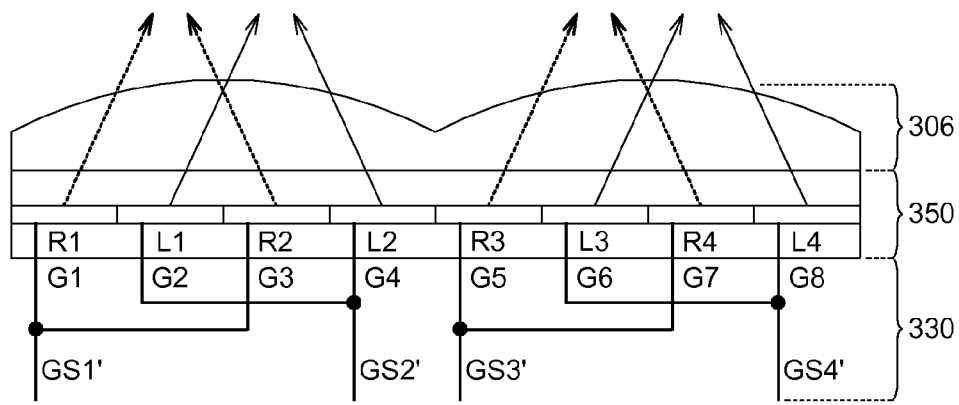
FIG. 8B illustrates a simplified cross section view of the 2D/3D switchable display module in a two dimensional mode.

FIG. 8A illustrates a simplified cross section view of the two view 2D/3D switchable display module 300 in a three dimensional mode. FIG. 8B illustrates a simplified cross section view of the 2D/3D switchable display module 300 in a two dimensional mode. The structure of the 2D/3D switchable display module 300 is similar to that of the 2D/3D switchable display module 100 or the 2D/3D switchable display module 200. In this embodiment, each optical element of the optical module 306 corresponds to four sub pixel units. The waveforms of the driving signals similar to that in embodiments 1 and 2 can be applied in this embodiment. The driving method for switching between 2D and 3D in this embodiment is revered from that in embodiments 1 and 2. Signals from scan driver 330 are outputted to the pixel matrix 350. The first pixel group R1, the second pixel group L1, the third pixel group R2 and the fourth pixel group L2 are covered by the same optical element (the curvature corresponding to each sub pixels is different with embodiment 1 and 2).

Referring to FIG. 8A, in a 3D mode, the first pixel group R1 and the second pixel group L1 receive the same scan signal GS1 simultaneously, the third pixel group R2 and the fourth pixel group L2 receive the same scan signal GS2 simultaneously. Besides, the fifth pixel group R3 and the sixth pixel group L3 receive the same scan signal GS3 simultaneously, and the seventh pixel group R4 and the eighth pixel group L4 receive the same scan signal GS4 simultaneously. In other words, the gate driver 330 provides same scan signal to more than one adjacent (serial) gate lines at the same time.

In other words, in 3D mode, the gate driver 330 provides a first scan signal GS1 to two adjacent gate lines simultaneously in a period, and the gate driver 330 provides a second scan signal GS2 to next two adjacent gate lines of the gate lines simultaneously in a next period, Referring to FIG. 8B, in a 2D mode, the first pixel group R1 and the third pixel group R2 receive the same scan signal GS1' simultaneously, the second pixel group L1 and the fourth pixel group L2 receive the same scan signal GS2' simultaneously. Besides, the fifth pixel group R3 and the seventh pixel group R4 receive the same scan signal GS3' simultaneously, and the sixth pixel group L3 and the eighth pixel group L4 receive the same scan signal GS4' simultaneously. In other words, the gate driver 330 provides the same scan signal to more than one non-adjacent (non-serial) gate lines at the same time.

In other words, in 2D mode, the gate driver 330 provides a first scan signal GS1' to two adjacent odd gate lines simultaneously in a period, and the gate driver 330 provides a second scan signal GS2' to two adjacent even gate lines simultaneously in a next period.

In this embodiment, the 2D/3D switchable display module 300 in FIGS. 8A-8B are implanted with the gate driver 330 controls the 2D/3D switchable display module 300 utilize double sub-pixel TFT array to drive the pixel matrix 350. Normal size image (half resolution image) can be inputted so that the resolution of the image remains (not to be doubled as sub pixels). In 3D mode, the gate driver 330 can drive at least two adjacent (serial)) gate lines at the same time. In 2D mode, the gate driver 330 can drive at least two non-adjacent (non-serial) gate lines at the same time. The switching process between 3D mode and 2D mode just depends on different driving schemes of waveform diagrams in the same circuit circumstances. Such that the manufacturing cost can be reduced. The gate driver 330 controls the 2D/3D switchable display module 300 to switch between 3D mode or 2D mode by means of swapping the first/the third gate lines and the second/the fourth gate lines to the first/second and the third/the fourth gate lines for receiving the same scan signal simultaneously.

Fourth Embodiment

Figure 9A:
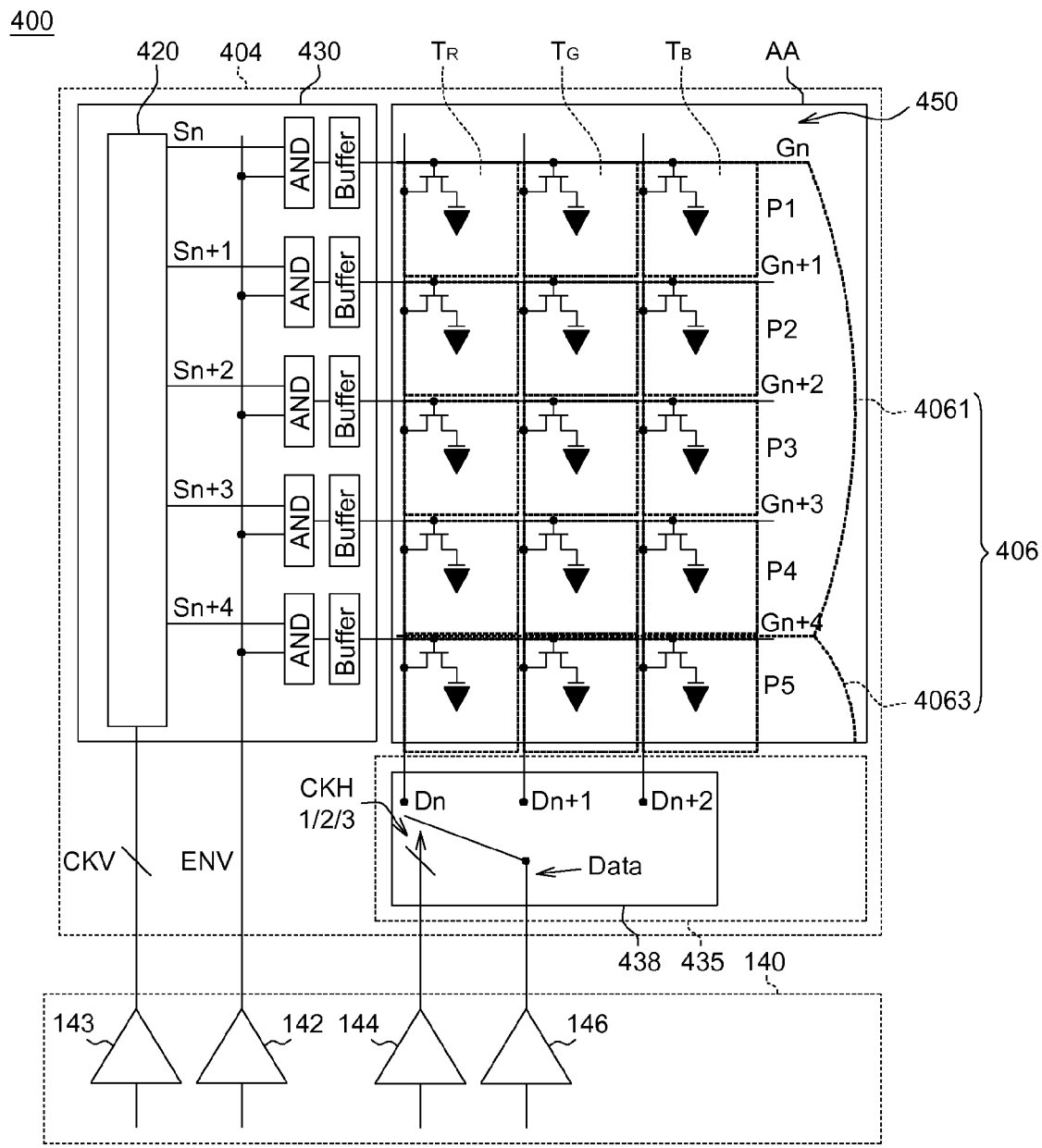
FIG. 9A illustrates a two dimensional/three dimensional (2D/3D) switchable display module with eye tracking system.

FIG. 9A illustrates a two dimensional/three dimensional (2D/3D) switchable display module 400 with eye tracking system. Compared with embodiment 1, 2 and 3, the two dimensional/three dimensional (2D/3D) switchable display module 400 get wider view zone. Referring to FIG. 9A, the 2D/3D switchable display module 400 comprises a display panel 404, a gate driver 430, a data driver 435, an optical module 406, a display driver IC 440 and a eye tracking system (not shown). The display panel 404 has a pixel matrix 550 comprising a plurality of sub pixels. The sub pixels of the pixel matrix 550 arranged in matrix type and each one is electrically coupled to at least one gate line and at least one data line by at least one thin film transistor (TFT). The gate lines, such as a first gate line Gn, a second gate line Gn+1, a third gate line Gn+2, a fourth gate line Gn+3 and a fifth gate line Gn+4 are arranged sequentially. The data line Dn, data line Dn+1 and data line Dn+2 are arranged sequentially. Where n is a positive integral (such as 1, 2, 3 . . . , etc.) and the limit of n corresponds to the resolution of the display panel 404. Each sub pixels of the pixel matrix 550 is electrically coupled to at least one gate line and at least one data line by at least one thin film transistor (TFT). A portion of the pixel matrix 150 is called an active area AA for showing images. The sub pixels not belong to the active area AA are called dummy sub pixels which are often covered by black matrix (BM) and not for displaying. The additional eye tracking system can detect the eyes position of the observer for changing driving schemes or image input mechanisms.

The optical module 406 is disposed on the display panel 404 and fully covers the active area AA for changing a light path of a light emitting from the active area AA. The interlayer of the optical module 406 and the display panel 404 is air, glue or other optical modulating material. The material and manufacturing method of the optical module 406 can be the same as that of the optical module 106, and the invention is not limited thereto. The optical module 406 comprises a plurality of optical elements, such as a first optical element 4061 and a second optical element 4063, the first optical element 4061 and the second optical element 4063 are arranged in row along a direction of each of the gate lines Gn~Gn+4. Each optical element corresponds to four adjacent rows of the sub pixels. The first optical element 4061 is lens shaped and covers the sub pixels corresponding to the first gate line Gn, the second gate line Gn+1, the third gate line Gn+2 and the fourth gate line Gn+3. The second optical element 4063 is lens shaped and covers the sub pixels corresponding to the fifth gate line Gn+4, the sixth gate line Gn+5, the seventh gate line Gn+6 and the eighth gate line Gn+7 (where the gate line Gn+5 to the gate line Gn+7 are omitted in FIG. 9A). The curvature of the first optical element 4061 and second optical element 4063 can be the same or different according to an optical design. The gate driver 430 comprising a shift register 420, a plurality of AND logic gates (AND), a plurality of buffers (Buffer), and an enable line. The gate driver 430 can be a plurality of groups, and each group comprises a shift register, an AND logic gates and a buffer. The input terminals of each AND logic gates are electrically coupled with the shift register 420 and one corresponding enable line. The output terminal of each AND logic gate is electrically coupled with an input terminal of a corresponding buffer. The output terminal of the buffer connects with one corresponding gate line Gn, Gn+1, Gn+2 or Gn+3 for providing scan signals to the gate lines Gn~Gn+4. The data driver 435 comprising at least one de-multiplexer 438 is used for providing a plurality of data signals to the data lines Dn~Dn+2 sequentially or randomly. In one embodiment, the 2D/3D switchable display module 400 can be implanted by a system on glass (SOG) circuit. The manufacturing method and the material of the gate driver 430 and the data driver 435 can be the same as that of the gate driver 130 and the data driver 135.

Figure 9B:
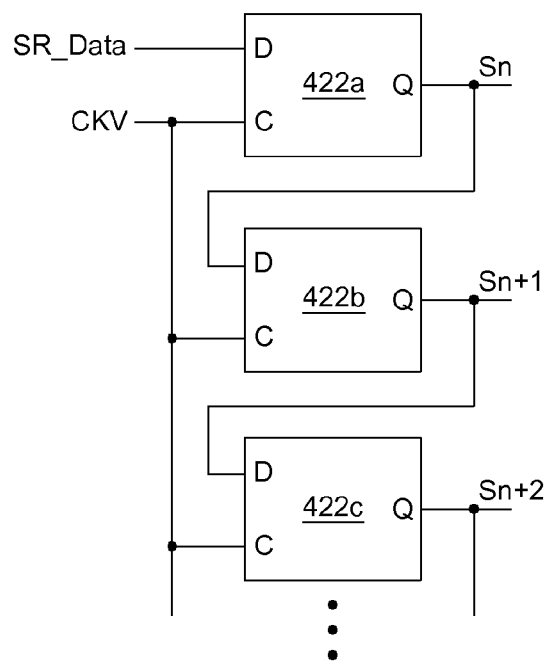
FIG. 9B illustrates a shift register in the two dimensional/three dimensional (2D/3D) switchable display module in FIG. 9A.
Figure 9C:
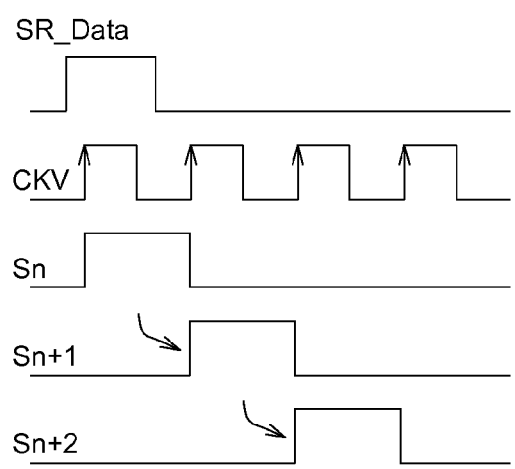
FIG. 9C illustrates a diagram showing signal waveforms of a shift register in FIG. 9B.

In this embodiment, the gate driver 430 comprises a shift register 422 (shown in FIG. 9B) for generating scan timing signals. Referring to FIGS. 9B~9C, the shift register 422 comprises a plurality of flip-flop circuit 422a, flip-flop circuit 422b and flip-flop circuit 422c connected serially. For example, a first one of the flip-flop circuit 422a is used for receiving a first square wave SR_Data and a clock signal CKV and outputting a first initial signal Sn, a second one of the flip-flop circuit 422b is used for receiving the first initial signal Sn and the clock signal CKV and outputting a second initial signal Sn+1, a third one of the flip-flop circuit 422c is used for receiving the second initial signal Sn+1 and the clock signal CKV.

The pixel matrix 450 comprising a plurality of sub pixels. The sub pixels in a same column are covered by same color filter and display the same color. The red sub pixels $T_R$, the green sub pixels $T_G$ and the blue sub pixels $T_B$ are independently disposed and respectively arranged in each column. A red sub pixel $T_R$, a green sub pixel $T_G$ and a blue sub pixel $T_B$ make a complete pixel (display dot). The sub pixels with the same color are arranged in a direction orthogonal to a long axis of the optical element 4061 or a long axis of the optical element 4063. The pixel matrix 450 comprises a first pixel group P1, a second pixel group P1, a third pixel group P3, a fourth pixel group P4 and a fifth pixel group P5 sequentially disposed in row along a direction of each of the gate lines Gn~Gn+4. The first pixel group P1, the second pixel group P2, the third pixel group P3 and the fourth pixel group P4 are covered by the first optical element 4061.

Figure 10A:
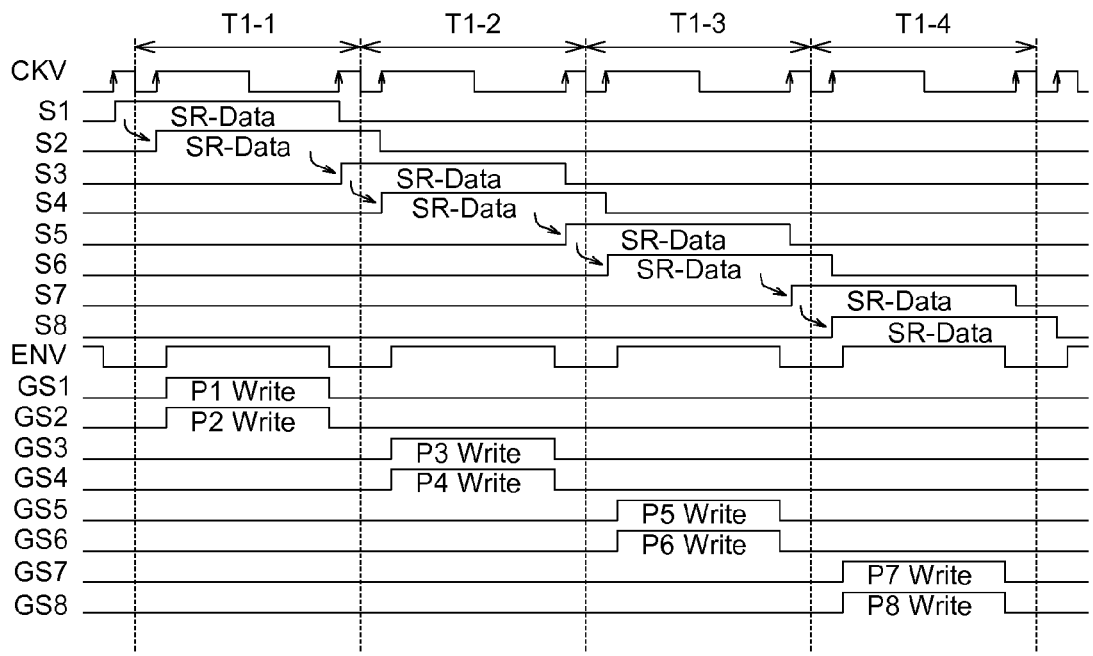
FIG. 10A illustrates waveforms of the clock signal CKV, enable signal ENV, initial signals S1~S8 and GS1~GS8 on the gate lines G1~G8 for driving the 2D/3D switchable display module of FIG. 9A in a three dimensional mode.

FIG. 10A illustrates waveforms of the clock signal CKV, enable signal ENV, initial signals S1~S8 and scan signals GS1~GS8 on the gate lines G1~G8 for driving the 2D/3D switchable display module 400 in a three dimensional mode, where n=1. Referring to FIGS. 9A and 10A, the clock signal CKV, enable signal ENV and scan signals GS1~GS8 are designed to enable the TFTs coupling to the selected gate lines G1~G8. If the TFTs are enabled by scan signals, pixel groups P1~P5 will be charged by data signals. In this embodiment, the first gate line G1 and the second gate line G2 are enabled simultaneously. Besides, the third gate line G3 and the fourth gate line G4 are enabled simultaneously.

Figure 10B:
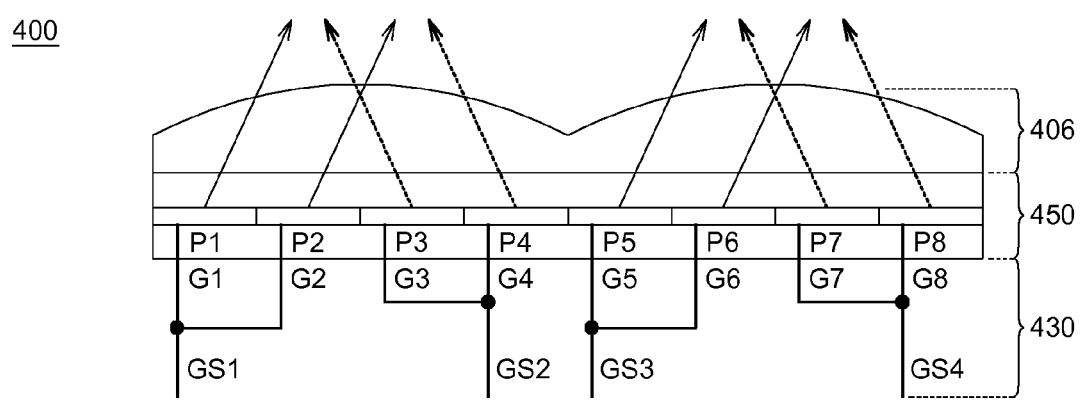
FIG. 10B illustrates a simplified cross section view of the 2D/3D switchable display module driving by ways of the waveforms in FIG. 10A.

FIG. 10B illustrates a simplified cross section view of the 2D/3D switchable display module 400 driving by ways of the waveforms in FIG. 10A. Referring to FIG. 10B, signals from gate driver 430 are outputted to the pixel matrix 550. In a three dimensional mode, the first pixel group P1 and the second pixel group P2 are driven by the scan signal GS1 simultaneously, the third pixel group P3 and the fourth pixel group P4 are driven by the scan signal GS2 simultaneously, the fifth pixel group P5 and the sixth pixel group P6 are driven by the scan signal GS3 simultaneously, and the seventh pixel group P7 and the eighth pixel group P8 are driven by the scan signal GS4 simultaneously. In other words, in 3D mode, the gate driver 430 provides a first scan signal GS1 to two adjacent gate lines at a same time in 3D mode.

Figure 11A:
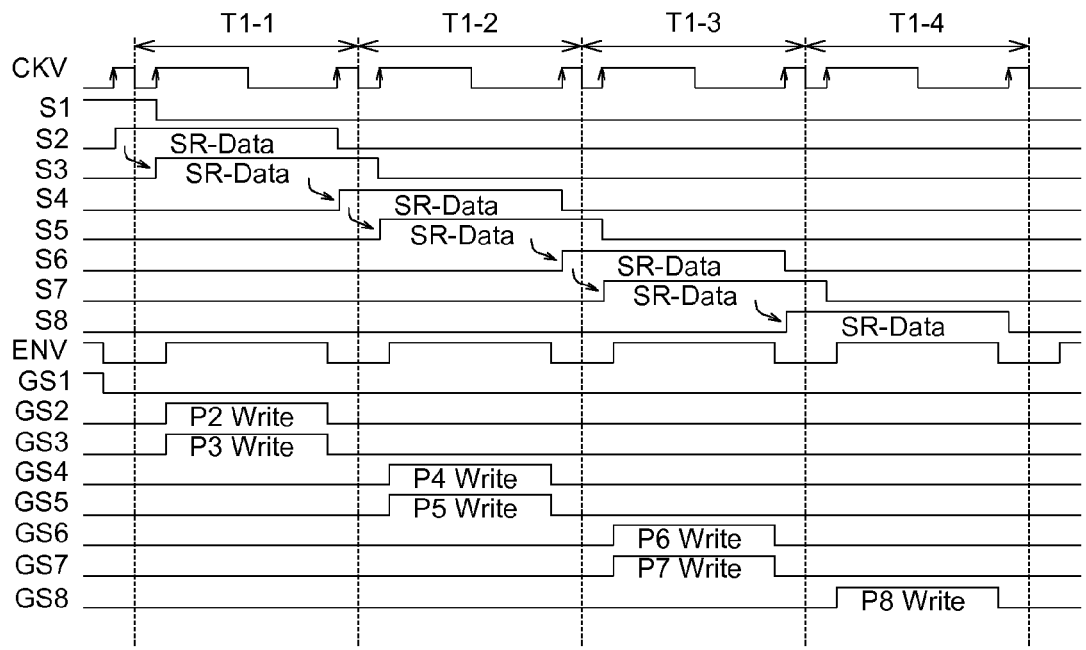
FIG. 11A illustrates waveforms of the clock signal CKV, enable signal ENV, initial signals S1~S8 and scan signals GS1~GS8 for driving the 2D/3D switchable display module of FIG. 9A in a three dimensional mode.

FIG. 11A illustrates waveforms of the clock signal CKV, enable signal ENV, initial signals S1~S8 and scan signals GS1~GS8 for driving the 2D/3D switchable display module 400 in another three dimensional mode. In this embodiment, the observer is viewing from incline direction and be detected by the eye tracking system. Referring to FIG. 9A and FIG. 11A, the clock signal CKV, enable signal ENV and scan signals GS1~GS8 are designed to enable the TFTs coupling to the selected gate lines G1~G8. The scan signals in FIG. 11A are shifted from that in FIG. 10A, so that the image output position can be shifted with a sub-pixel step in 3D mode in this embodiment. The signal is switched based on an eye-tracking information. In this embodiment, the second gate line G2 and the third gate line G3 are enabled simultaneously. Besides, the fourth gate line G4 and the fifth gate line G5 are enabled simultaneously.

Figure 11B:
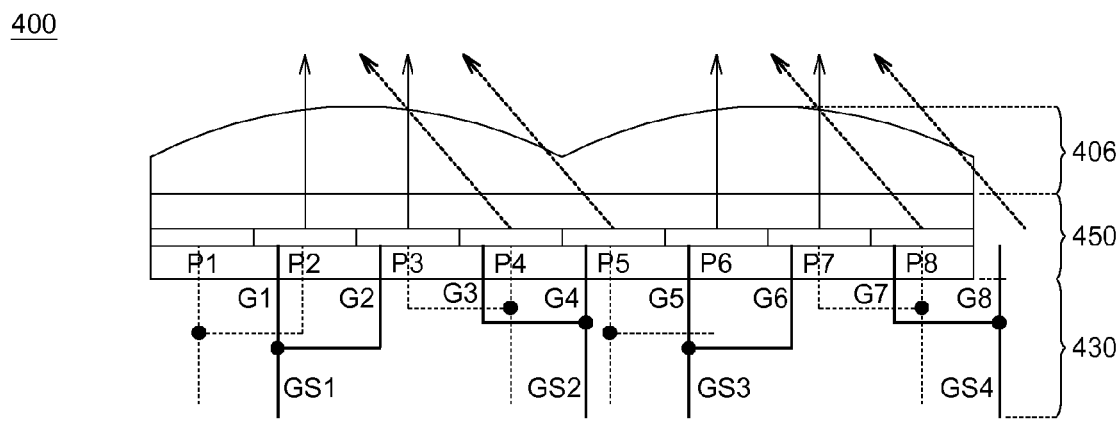
FIG. 11B illustrates a simplified cross section view of the 2D/3D switchable display module driving by ways of the waveforms in FIG. 11A.

FIG. 11B illustrates a simplified cross section view of the 2D/3D switchable display module 400 driving by ways of the waveforms in FIG. 11A. Referring to FIG. 11B, the 2D/3D switchable display module 400 can comprise a eye-tracking element (not shown). The scan signals from the gate driver 430 are outputted to the pixel matrix 450 and can be adjusted according to the eye-tracking information detected by the eye-tracking element. In this another three dimensional mode, the second pixel group P2 and the third pixel group P3 are driven by the scan signal GS1 simultaneously, the fourth pixel group P4 and the fifth pixel group P5 are driven by the scan signal GS2 simultaneously, the sixth pixel group P6 and the seventh pixel group P7 are driven by the scan signal GS3 simultaneously. Thus, based on eye-tracking information, image output position can be shifted by sub-pixel step and wider 3D viewing zone can be achieved. In other words, in 3D mode, the gate driver 430 provides a first scan signal GS1 to two adjacent gate lines at a same time in 3D mode.

Figure 12A:
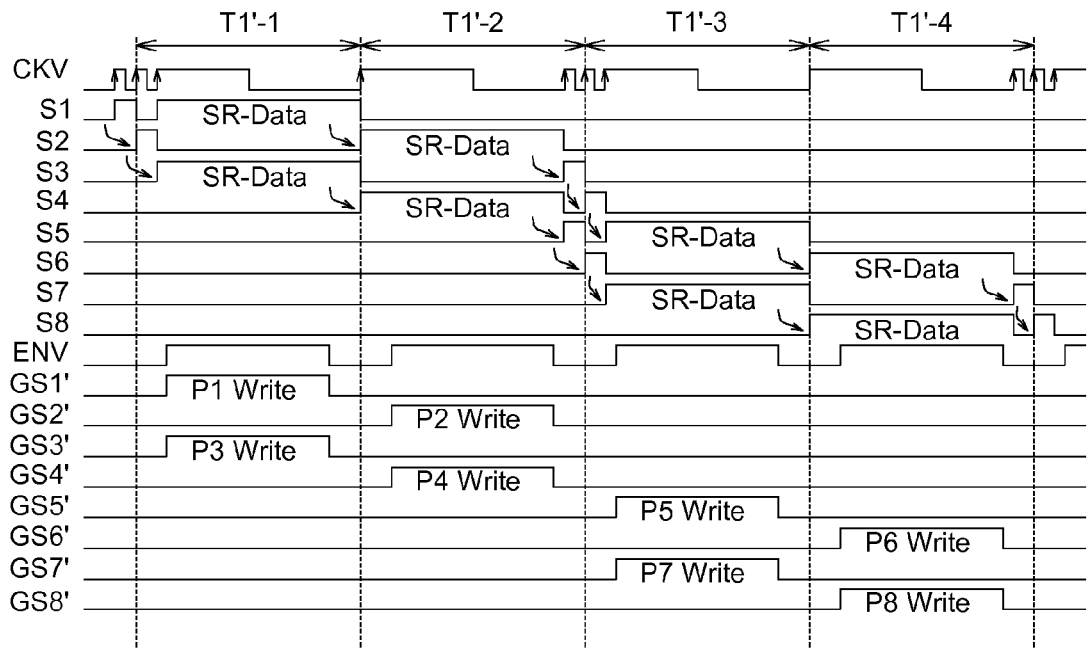
FIG. 12A illustrates waveforms of the clock signal CKV, enable signal ENV, initial signals S1~S8 and scan signals GS1~GS2 for driving the 2D/3D switchable display module in two dimensional mode.

FIG. 12A illustrates waveforms of the clock signal CKV, enable signal ENV, initial signals S1~S8 and scan signals GS1'~GS8' for driving the 2D/3D switchable display module 400 in two dimensional mode. Referring to FIG. 9A and FIG. 12A, the clock signal CKV, enable signal ENV and initial signals S1~S8 are designed to enable the TFTs coupling to the selected gate lines G1~G8. The scan signals in FIG. 12A are designed to enable the TFTs coupling to the selected gate lines G1~G8 by scan signals GS1'~GS8'. In this embodiment, the first gate line G1 and the third gate line G3 are enabled simultaneously. Besides, the second gate line G2 and the fourth gate line G4 are enabled simultaneously.

Figure 12B:
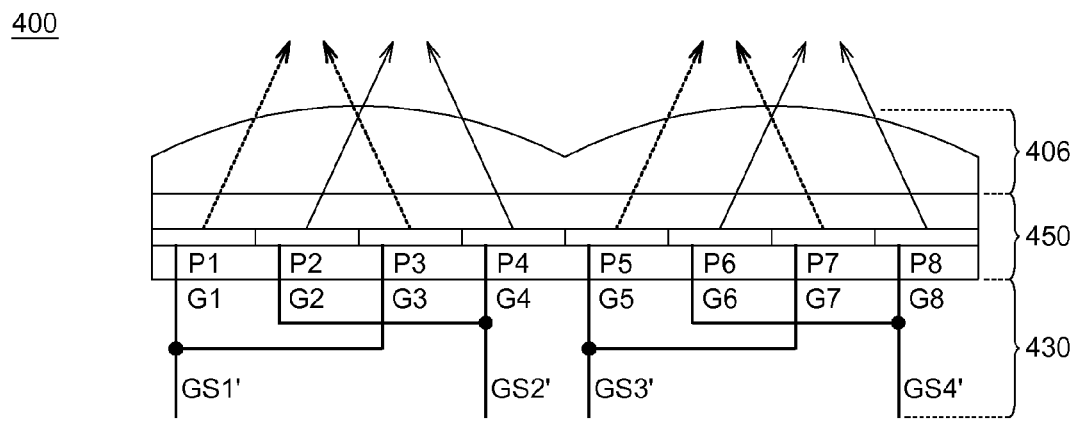
FIG. 12B illustrates a simplified cross section view of the 2D/3D switchable display module driving by ways of the waveforms of driving signals in FIG. 12A.

FIG. 12B illustrates a simplified cross section view of the 2D/3D switchable display module 400 driving by ways of the waveforms of driving signals in FIG. 12A. Referring to FIG. 12B, in this two dimensional mode, the first pixel group P1 and the third pixel group P3 are driven by the scan signal GS1' simultaneously, the second pixel group P2 and the fourth pixel group P4 are driven by the scan signal GS2' simultaneously, the fifth pixel group P5 and the seventh pixel group P7 are driven by the scan signal GS3' simultaneously, and the sixth pixel group P6 and the eighth pixel group P8 are driven by the scan signal GS4' simultaneously. In other words, the gate driver 430 provides a first scan signal GS1' to two non-adjacent gate lines at a same time in 2D mode.

In 3D mode, the gate driver can drive at least two adjacent (serial) gate lines at the same time. In 2D mode, the gate driver can drive at least two non-adjacent (non-serial) gate lines at the same time. The switching process between 3D mode and 2D mode depends on different driving schemes of waveform diagrams in the same circuit circumstances. Such that the manufacturing cost can be reduced.

Fifth Embodiment

Figure 13A:
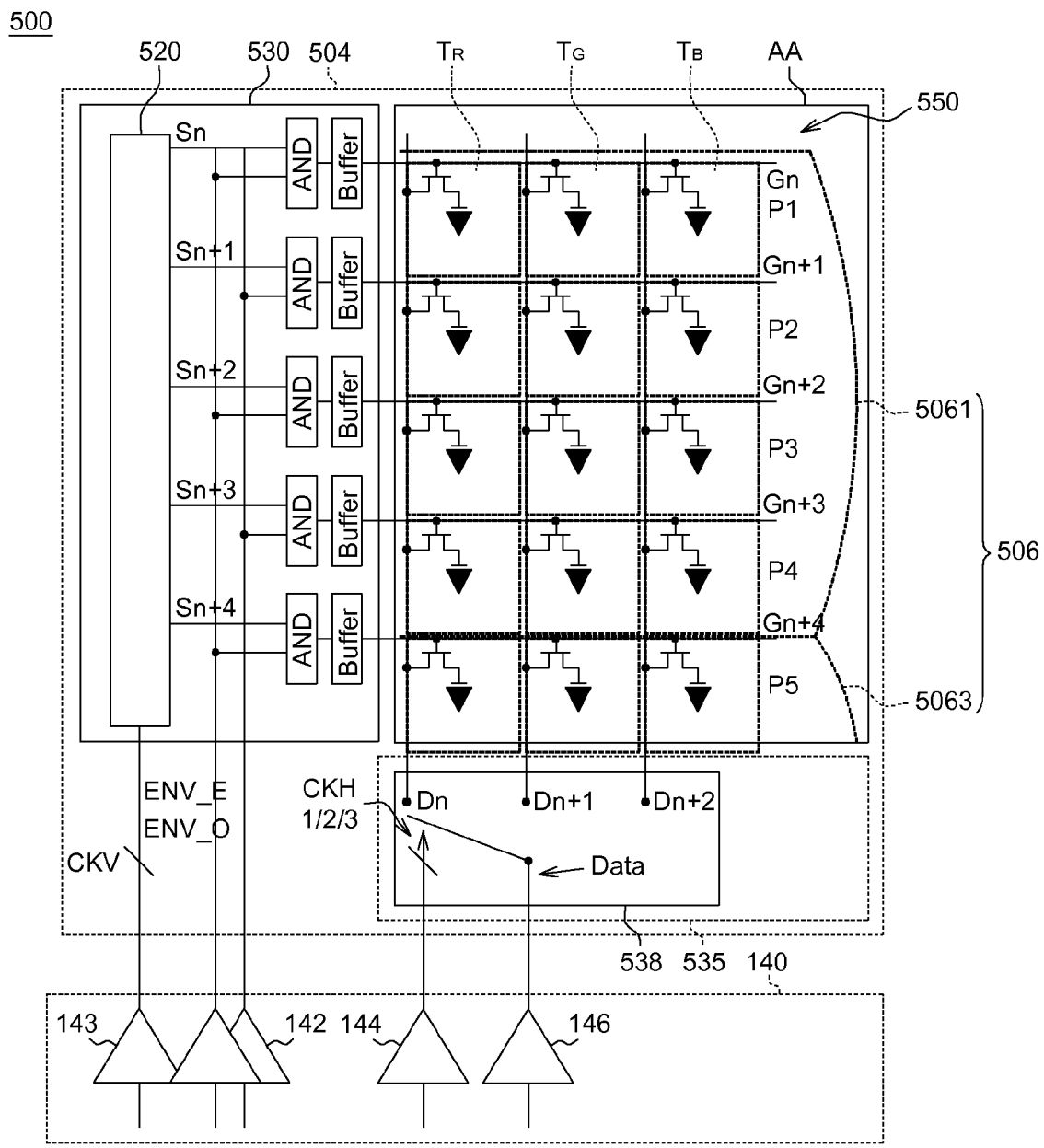
FIG. 13A illustrates a two view type two dimensional/three dimensional (2D/3D) switchable display module.

FIG. 13A illustrates a two view two dimensional/three dimensional (2D/3D) switchable display module 500. Referring to FIG. 13A, the 2D/3D switchable display module 500 comprises a display panel 504, a gate driver 530, a data driver 535, an optical module 506, a display driver IC 540. The display panel 504 has a pixel matrix 550 comprising a plurality of sub pixels. The gate lines, such as a first gate line Gn, a second gate line Gn+1, a third gate line Gn+2, a fourth gate line Gn+3 and a fifth gate line Gn+4 are arranged sequentially. The data line Dn, data line Dn+1 and data line Dn+2 are arranged sequentially. Each sub pixels of the pixel matrix 550 is electrically coupled to at least one gate line and at least one data line by at least one thin film transistor (TFT).

The optical module 506 is disposed on the display panel 504 and fully covers the active area AA for changing a light path of a light emitting from the active area AA. The material and manufacturing method of the optical module 506 can be the same as that of the optical module 406. The optical module 506 comprises a plurality of optical elements, such as a first optical element 5061 and a second optical element 5063, arranged in row along a direction of each of the gate lines Gn~Gn+4. Each optical element corresponds to four adjacent rows of the sub pixels. The first optical element 5061 is lens shaped and covers the sub pixels corresponding to the first gate line Gn, the second gate line Gn+1, the third gate line Gn+2 and the fourth gate line Gn+3. The second optical element 5063 is lens shaped and covers the sub pixels corresponding to the fifth gate line Gn+4, the sixth gate line Gn+5, the seventh gate line Gn+6 and the eighth gate line Gn+7 (wherein the gate line Gn+5 to the gate line Gn+7 are omitted in FIG. 13A). The curvature of the first optical element 5061 and second optical element 5063 can be the same or different according to the optical design. The gate driver 530 comprising a shift register 520, a plurality of AND logic gates, a plurality of buffers (Buffer) and two enable lines. The gate driver 430 can be a plurality of groups, and each group includes a shift register, an AND logic gates and a buffer. The input terminals of each AND logic gates are electrically coupled with the shift register 520 and one corresponding enable line. The output terminal of each AND logic gates is electrically coupled with one buffer's input terminal. The output terminal of the buffer connects with one corresponding gate line Gn, Gn+1, Gn+2 and Gn+3 for providing scan signals to the gate lines Gn~Gn+4. The data driver 535 comprising at least one de-multiplexer 438 is used for providing a plurality of data signals to the data lines Dn~Dn+2. In one embodiment, the 2D/3D switchable display module 500 can be implanted by a system on glass (SOG) circuit. The manufacturing method and the material of the gate driver 530 and the data driver 535 can be the same as that of the gate driver 130 and the data driver 135.

Figure 13B:
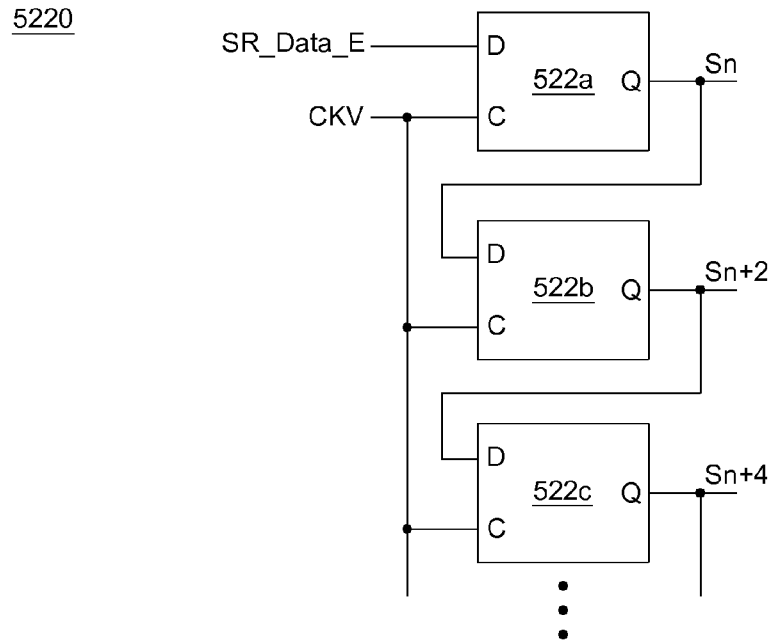
FIG. 13B-13C illustrate shift registers in the two view type two dimensional/three dimensional (2D/3D) switchable display module in FIG. 13A.
Figure 13C:
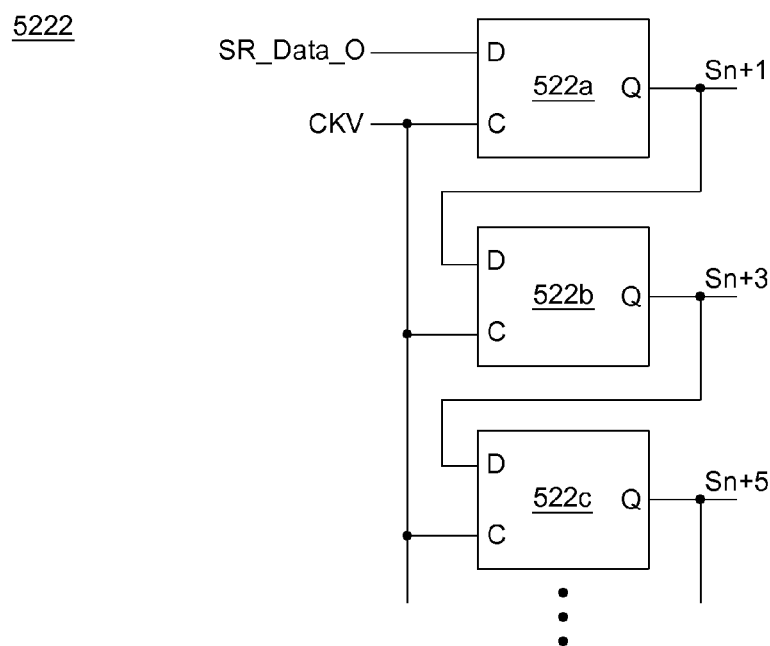

In this embodiment, the gate driver 530 comprises a shift register module 520 comprising a shift register 5220 and a shift register 5222 (shown in FIG. 13C) for generating scan timing signals. Referring to FIGS. 13B-13C, each of the shift register 5220 and the shift register 5222 comprises a plurality of flip-flop circuit 522a, flip-flop circuit 522b and flip-flop circuit 522c connected serially. The shift register 5220 and the shift register 5222 can be the same as the shift register 422. The shift register 5220 and the another shift register 5222 are used for generating scan timing signals to drive odd rows of the gate lines and even rows of the gate lines respectively.

The pixel matrix 550 comprises a plurality of sub pixels. The pixels in a same column are covered by same color filter and display the same color. The red sub pixels $T_R$, the green sub pixels $T_G$ and the blue sub pixels $T_B$ are independently disposed and respectively arranged in each column. A red sub pixel $T_R$, a green sub pixel $T_G$ and a blue sub pixel $T_B$ make a complete pixel (display dot). The sub pixels with the same color are arranged in a direction orthogonal to a long axis of the optical element 5061 or a long axis of the optical element 5063. The pixel matrix 550 can be the same as pixel matrix 450 and comprises a first pixel group P1, a second pixel group P2, a third pixel group P3, a fourth pixel group P4 and a fifth pixel group P5 sequentially disposed in row along a direction of each of the gate lines Gn~Gn+4. The first pixel group P1, the second pixel group P2, the third pixel group P3 and the fourth pixel group P4 are covered by the first optical element 5061. The fifth pixel group P5 is covered by the second optical element 5063.

Figure 14A:
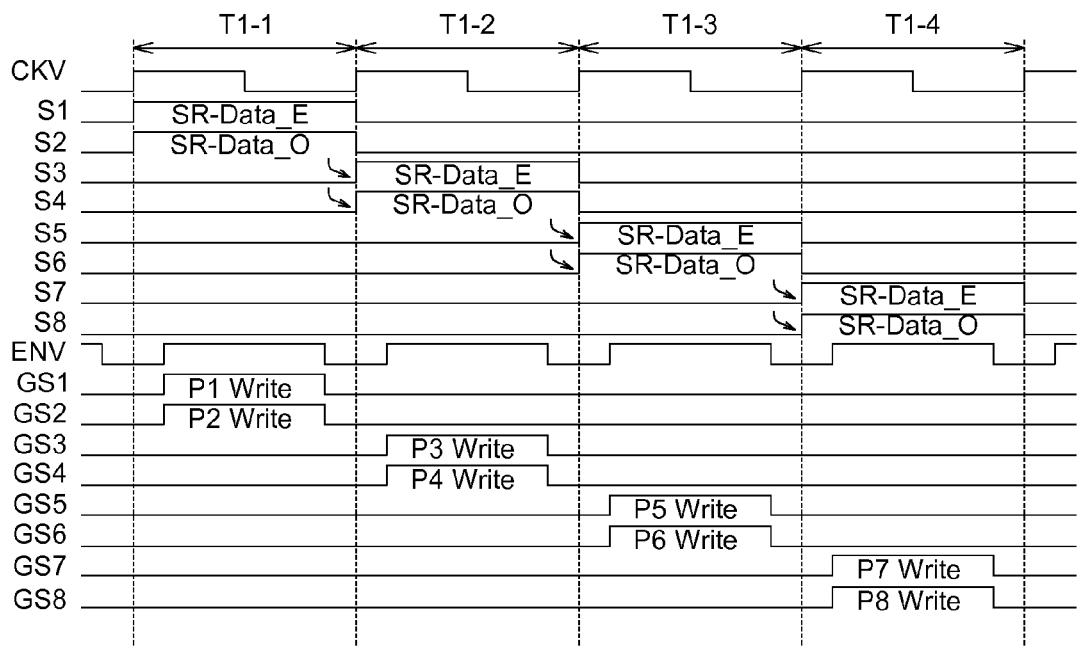
FIG. 14A illustrates waveforms of the clock signal CKV, enable signal ENV, initial signals S1~S8 and scan signals GS1~GS8 on the gate lines G1~G8 for driving the 2D/3D switchable display module in FIG. 13A in a three dimensional mode.

FIG. 14A illustrates waveforms of the clock signal CKV, enable signal ENV, initial signals S1~S8 and scan signals GS1~GS8 on the gate lines G1~G8 for driving the 2D/3D switchable display module 500 in a three dimensional mode. Referring to FIG. 14A, the clock signal CKV, enable signal ENV and initial signals S1~S8 and scan signals GS1~GS8 are designed to enable the TFTs coupling to the selected gate lines G1~G8. If the TFTs are enabled by scan signals, the pixel groups P1~P5 will be charged by data signals. In this embodiment, the first gate line G1 and the second gate line G2 are enabled simultaneously. Besides, the third gate line G3 and the fourth gate line G4 are enabled simultaneously. The cross section view of the 2D/3D switchable display module 500 driving by ways of the waveforms of FIG. 14A is similar to that in FIG. 10B.

Figure 14B:
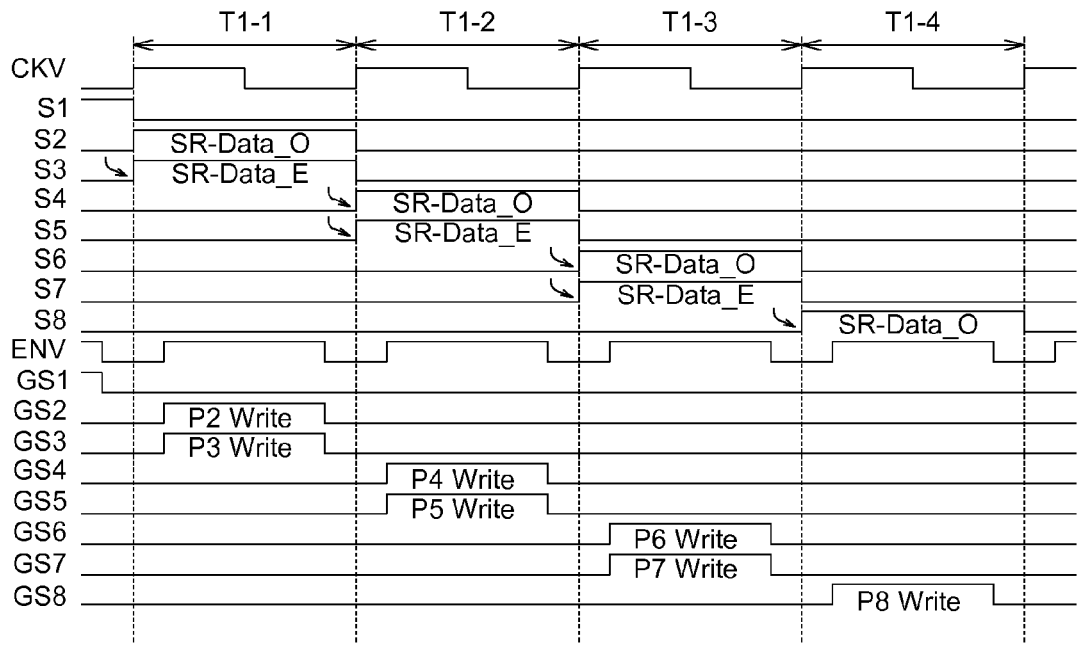
FIG. 14B illustrates waveforms of the clock signal CKV, enable signal ENV, initial signals S1~S8 and scan signals GS1~GS8 on the gate lines G1~G8 for driving the 2D/3D switchable display module in FIG. 13A in another three dimensional mode.

FIG. 14B illustrates waveforms of the clock signal CKV, enable signal ENV, initial signals S1~S8 and scan signals GS1~GS8 on the gate lines G1~G8 for driving the 2D/3D switchable display module 500 in another three dimensional mode. Referring to FIG. 14B, the clock signal CKV, enable signal ENV, initial signals S1~S8 and scan signals GS1~GS8 are designed to enable the TFTs coupling to the selected gate lines G1~G8. The scan signals in FIG. 14B are shifted from that in FIG. 14A, so that the image output position can be shifted with a sub-pixel step in 3D mode in this embodiment. The signal is switched based on an eye-tracking information. In this embodiment, the second gate line G2 and the third gate line G3 are enabled simultaneously. Besides, the fourth gate line G4 and the fifth gate line G5 are enabled simultaneously. The cross section view of the 2D/3D switchable display module 500 driving by ways of the waveforms of FIG. 14B is similar to that in FIG. 11B.

Figure 14C:
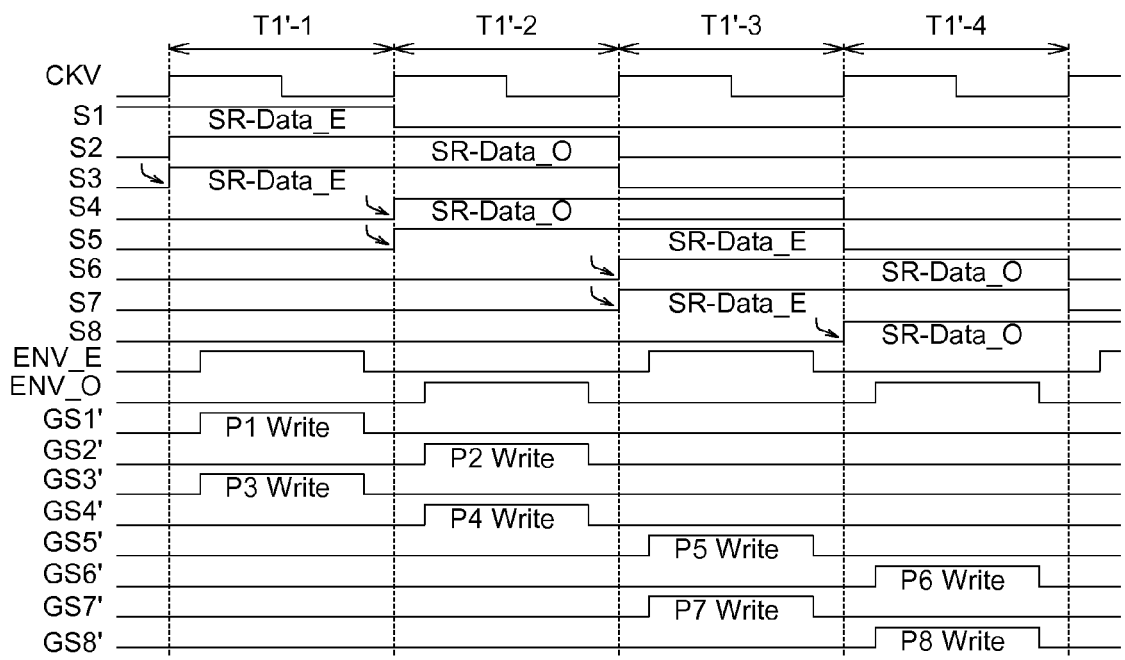
FIG. 14C illustrates waveforms of the clock signal CKV, enable signal ENV, initial signals S1~S8 and scan signals GS1~GS8 on the gate lines G1~G8 for driving the 2D/3D switchable display module in two dimensional mode.

FIG. 14C illustrates waveforms of the clock signal CKV, enable signal ENV, initial signals S1~S8 and scan signals GS1'~GS8' on the gate lines G1~G8 for driving the 2D/3D switchable display module 500 in two dimensional mode. Referring to FIG. 14C, the clock signal CKV, enable signal ENV, initial signals S1~S8 and scan signals GS1'~GS8' are designed to enable the TFTs coupling to the selected gate lines G1~G8. The scan signals in FIG. 14C are designed to enable the TFTs coupling to the selected gate lines G1~G8. In this embodiment, the second gate line G2 and the fourth gate line G4 are enabled simultaneously. Besides, the third gate line G3 and the fifth gate line G5 are enabled simultaneously. The cross section view of the 2D/3D switchable display module 500 driving by ways of the waveforms of FIG. 14C is similar to that in FIG. 12B.

In 3D mode, the gate driver 530 can drive at least two adjacent (serial) gate lines at the same time. In 2D mode, the gate driver 530 can drive at least two non-adjacent (non-serial) gate lines at the same time. The switching process between 3D mode and 2D mode depends on different driving schemes of waveform diagrams in the same circuit circumstances. Such that the manufacturing cost can be reduced.

Based on the above, the 2D/3D switchable display module according to the above embodiments of this invention can be manufactured in a easy way. The 2D/3D switchable display module has a high performance because the resolution would not loss in 2D mode, even the fixed lens remains on the surface of the display. Besides, the 2D/3D switchable display module does not require additional gate driver, data driver or IC display driver so that the manufactured cost can be controlled.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A two dimensional/three dimensional (2D/3D) switchable display module, comprising:
   a display panel comprising a plurality of sub pixels electrically coupled to a plurality of gate lines and a plurality of data lines;
   an optical module disposed on the display panel changing light path from the display panel;
   a gate driver providing a plurality of scan signals to the gate lines;
   a data driver providing a plurality of data signals to the data lines, wherein the gate driver provides the same scan signal to more than one gate lines at a same time or the data driver provides the same data signal to more than one data lines at a same time for displaying images; and
   a display driver IC controlling the gate driver and the data driver, wherein the display driver IC comprises a scan time controller, a shift register controller, a de-multiplexer time controller and a data output circuit,
   wherein the gate driver comprises a shift register, four AND logic gates, four buffers and four enable lines, and wherein an input of the shift register connects with the shift register controller and an output of the shift register connects with a first terminal of each of the AND logic gates, a second terminal of each of the AND logic gates connects with the scan time controller by a corresponding one of the enable lines and a third terminal of each of the AND logic gates connects with a corresponding one of the buffers and the buffers, one terminal of each of the buffers connect with corresponding gate lines, the data driver comprises a de-multiplexer, wherein input terminals of the de-multiplexer connect with the de-multiplexer time controller and the data output circuit, input terminals of the de-multiplexer connect with corresponding data lines.

2. The two dimensional/three dimensional (2D/3D) switchable display module according to claim 1, wherein the gate driver and the data driver are disposed on the display panel.

3. The two dimensional/three dimensional (2D/3D) switchable display module according to claim 1, wherein an active layer of the gate driver and an active layer of the data driver are low temperature poly-Si (LTPS), α-Si, or IGZO.

4. The two dimensional/three dimensional (2D/3D) switchable display module according to claim 1, wherein the optical module comprises a plurality of optical elements corresponding to two adjacent rows of the sub pixels or two adjacent columns of the sub pixels.

5. The two dimensional/three dimensional (2D/3D) switchable display module according to claim 4, wherein an arrangement direction of the sub pixels with a same color and a long axis of the optical element are orthogonal.

6. The two dimensional/three dimensional (2D/3D) switchable display module according to claim 1, wherein the optical module comprises a plurality of optical elements corresponding to four adjacent rows of the sub pixels or four adjacent columns of the sub pixels.

7. The two dimensional/three dimensional (2D/3D) switchable display module according to claim 6, wherein an arrangement direction of the sub pixels with the same color and a long axis of the optical element are orthogonal.

8. The two dimensional/three dimensional (2D/3D) switchable display module according to claim 1, wherein the gate driver drives more than one non-adjacent gate lines at a same time in 3D mode, and the gate driver drives more than one adjacent gate lines at a same time in 2D mode.

9. The two dimensional/three dimensional (2D/3D) switchable display module according to claim 4, wherein in three dimensional mode, the gate driver provides a first enable signal to enable TFTs on two adjacent odd gate lines of the gate lines simultaneously in a period T1-1, and the gate driver provides a second enable signal to enable TFTs on two adjacent even gate lines of the gate lines simultaneously in a next period T1-2, in two dimensional mode, the gate driver provides a first enable signal to enable TFTs on two adjacent gate lines of the gate lines simultaneously in a period T1'-1, and the gate driver provides a second enable signal to enable TFTs on next two adjacent gate lines of the gate lines simultaneously in a next period T1'-2.

10. The two dimensional/three dimensional (2D/3D) switchable display module according to claim 1, wherein in three dimensional mode, the display driver IC controls the data driver to provide a first data signal DS1 to two adjacent odd data lines of the data lines simultaneously in a period T1-1, and the data driver provides a second data signal DS2 to two adjacent even data lines of the data lines simultaneously in a next period T1-2, in two dimensional mode, the data driver provides a first data signal DS1' to two adjacent data lines of the data lines simultaneously in a period T1'-1, and the data driver provides a second data signal DS2' to next two adjacent data line of the data lines simultaneously in next period T1'-2.

11. The two dimensional/three dimensional (2D/3D) switchable display module according to claim 1, wherein the gate driver provides a first scan signal GS1 to more than one adjacent gate lines of the gate lines at a same time in 3D mode, and the gate driver provides a first scan signal GS1' to more than one non-adjacent gate lines of the gate lines at a same time in 2D mode.

12. The two dimensional/three dimensional (2D/3D) switchable display module according to claim 6, wherein in three dimensional mode, the gate driver provides a first enable signal to enable TFTs on two adjacent gate lines of the gate lines simultaneously in a period T1-1, and the gate driver provides a second enable signal to enable TFTs on two adjacent gate lines of the gate lines simultaneously in a next period T1-2, in two dimensional mode, the gate driver provides a first enable signal to enable TFTs on two adjacent odd gate lines of the gate lines simultaneously in a period T1'-1, and the gate driver provides a second enable signal to enable TFTs on two adjacent even gate lines of the gate lines simultaneously in a next period T1'-2.

13. The two dimensional/three dimensional (2D/3D) switchable display module according to claim 1, wherein odd AND logic gates of the AND logic gates connect with the scan time controller by odd enable lines of the enable lines, and even AND logic gates of the AND logic gates connect with the scan time controller by even enable lines of the enable lines.

14. The two dimensional/three dimensional (2D/3D) switchable display module according to claim 1, wherein the shift register comprises a plurality of flip-flop circuits connected serially, a first one of the flip-flop circuits receiving a first initial signal and a clock signal and outputting a first scan signal, a second one of the flip-flop circuits receiving the first scan signal and the clock signal and outputting a third scan signal, a third one of the flip-flop circuits receiving the third scan signal and the clock signal.

15. The two dimensional/three dimensional (2D/3D) switchable display module according to claim 1, wherein the shift register and another shift register generating scan timing signals to drive odd rows of the gate lines and even rows of the gate lines respectively, the another shift register comprises a plurality of another flip-flop circuits connected serially, a first one of the another flip-flop circuits receiving a fourth scan signal and a clock signal and outputting a fifth scan signal, a second one of the another flip-flop circuits receiving the fifth scan signal and the clock signal and outputting a sixth scan signal and a third one of the another flip-flop circuits receiving the sixth scan signal and the clock signal.

16. The two dimensional/three dimensional (2D/3D) switchable display module according to claim 1, wherein an output of the display driver IC is controlled by an eye-tracking system.

17. The two dimensional/three dimensional (2D/3D) switchable display module according to claim 4, wherein the optical module is fixed lenticular lens type, and the optical elements of the optical module are lens shaped.

18. A method for driving two dimensional/three dimensional (2D/3D) switchable display module, comprising:
providing a display panel comprising a plurality of sub pixels, an optical module, a gate driver and a data driver, the sub pixels electrically coupled to a plurality of gate lines and a plurality of data lines, the optical module disposed on the display panel for changing to change light path from the display panel; and the gate driver providing a same scan signal to more than one gate lines at a same time or the data driver providing a same data signal to more than one data lines at a same time for displaying images; and
providing a display driver IC to control the gate driver and the data driver, wherein the display driver IC comprises a scan time controller, a shift register controller, a de-multiplexer time controller and a data output circuit,
wherein the gate driver comprises a shift register, four AND logic gates, four buffers and four enable lines, and wherein an input of the shift register connects with the shift register controller and an output of the shift register connects with a first terminal of each of the AND logic gates, a second terminal of each of the AND logic gates connects with the scan time controller by a corresponding one of the enable lines and a third terminal of each of the AND logic gates connects with a corresponding one of the buffers and the buffers, one terminal of each of the buffers connect with corresponding gate lines, the data driver comprises a de-multiplexer, wherein input terminals of the de-multiplexer connect with the de-multiplexer time controller and the data output circuit, input terminals of the de-multiplexer connect with corresponding data lines.

* * * * *